(12) United States Patent
Hano et al.

(10) Patent No.: US 8,710,788 B2
(45) Date of Patent: Apr. 29, 2014

(54) BRUSHLESS MOTOR DRIVE APPARATUS AND DRIVE METHOD

(75) Inventors: Masaki Hano, Isesaki (JP); Yoshitaka Iwaji, Hitachi (JP); Shigehisa Aoyagi, Hitachi (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 440 days.

(21) Appl. No.: 13/052,519

(22) Filed: Mar. 21, 2011

(65) Prior Publication Data

US 2011/0234133 A1    Sep. 29, 2011

(30) Foreign Application Priority Data

Mar. 23, 2010  (JP) ................................. 2010-065737
Jun. 24, 2010  (JP) ................................. 2010-143621

(51) Int. Cl.
*H02P 3/18*        (2006.01)

(52) U.S. Cl.
USPC ................. 318/721; 318/400.01; 318/400.14; 318/400.32; 318/400.34; 388/800; 388/909

(58) Field of Classification Search
USPC ............ 318/400.01, 400.07, 400.11, 400.14, 318/400.32, 400.33, 700, 721, 430, 432, 318/437, 400.16, 400.17, 400.31, 400.34, 318/400.35, 799, 800, 801; 388/800, 813, 388/909
See application file for complete search history.

(56) References Cited

U.S. PATENT DOCUMENTS 5,723,967 A * 3/1998 Hongo et al. ............ 318/400.11
6,160,367 A   12/2000 Higashi et al.
7,723,937 B2 * 5/2010 Kurosawa et al. ........ 318/400.34
7,768,226 B2 * 8/2010 Fukamizu et al. ............ 318/700
2002/0140395 A1 * 10/2002 Tazawa et al. ................ 318/727
2004/0113572 A1 * 6/2004 Iwaji et al. .................... 318/254
2008/0100243 A1 * 5/2008 Kurosawa et al. ............ 318/430
2009/0200971 A1 * 8/2009 Iwaji et al. ................ 318/400.11

FOREIGN PATENT DOCUMENTS

| JP | 06-253586 A | 9/1994 |
| JP | 09-294391 A | 11/1997 |
| JP | 2000-023487 A | 1/2000 |
| JP | 2001-025282 A | 1/2001 |
| JP | 2002-359991 A | 12/2002 |
| JP | 2009-189176 A | 8/2009 |

* cited by examiner

*Primary Examiner* — Antony M Paul
(74) *Attorney, Agent, or Firm* — Foley & Lardner LLP

(57) ABSTRACT

The present invention relates to a drive apparatus and drive method for switching an energization mode when a voltage of a non-energized phase of a brushless motor crosses a threshold. In threshold learning, first, the brushless motor is stopped at an initial position. The brushless motor is then rotated by performing phase energization based on the energization mode from the stopped state. The voltage of the non-energized phase at an angular position of switching the energization mode is detected from a maximum value or a minimum value of the voltage of the non-energized phase during the rotation, and the threshold is learned based on the detected voltage. Alternatively, the brushless motor is positioned at the angular position of switching the energization mode by maintaining one energization mode, and then the energization mode is switched to the next energization mode. The voltage of the non-energized phase immediately after the switching to the energization mode is detected, and the detected voltage of the non-energized phase is learned as the threshold used to determine the timing of switching to the next energization mode.

18 Claims, 39 Drawing Sheets

FIG 34

| TEMPERATURE CONDITION | VOLTAGE THRESHOLD |
|---|---|
| 15°C | XXX |
| 50°C | XXX |
| 80°C | XXX |
| 110°C | XXX |

FIG 35

| MODE SWITCHING | THRESHOLD |
|---|---|
| 1⇒2 | −(MINIMUM VALUE) |
| 2⇒3 | MINIMUM VALUE |
| 3⇒4 | −(MINIMUM VALUE) |
| 4⇒5 | MINIMUM VALUE |
| 5⇒6 | −(MINIMUM VALUE) |
| 6⇒1 | MINIMUM VALUE |

FIG 36

| MODE SWITCHING | THRESHOLD |
|---|---|
| 1⇒2 | MAXIMUM VALUE OF LEARNING RESULT OF MODE SWITCHING 1→2, 3→4, 5→6 |
| 2⇒3 | MINIMUM VALUE OF LEARNING RESULT OF MODE SWITCHING 2→3, 4→5, 6→1 |
| 3⇒4 | SAME AS MODE SWITCHING 1→2 |
| 4⇒5 | SAME AS MODE SWITCHING 2→3 |
| 5⇒6 | SAME AS MODE SWITCHING 1→2 |
| 6⇒1 | SAME AS MODE SWITCHING 2→3 |

BRUSHLESS MOTOR DRIVE APPARATUS AND DRIVE METHOD

BACKGROUND OF THE INVENTION

1. Field of the Invention

The present invention relates to a sensorless brushless motor drive apparatus and drive method.

2. Description of Related Art

Japanese Laid-Open (Kokai) Patent Application Publication No. 2009-189176 discloses a synchronous electric motor drive system in which a terminal voltage of a non-energized phase of three phases in a three-phase synchronous electric motor is compared with a reference voltage, and an energization mode is sequentially switched according to a result of the comparison.

In sensorless drive control mentioned above, an induced voltage in the non-energized phase varies due to detection variations of a voltage detection circuit, motor (winding) variations, temperature environments, and so on. This causes a deviation in energization mode switching timing, leading to a decrease in efficiency and step-out.

SUMMARY OF THE INVENTION

In view of this, an object of the present invention is to provide a brushless motor drive apparatus and drive method that can suppress a deviation in energization mode switching timing caused by various factors and thereby prevent a decrease in efficiency and step-out.

To achieve the stated object, a brushless motor drive apparatus according to the present invention switches an energization mode based on a result of comparison between a voltage of a non-energized phase and a threshold, the brushless motor drive apparatus setting the threshold based on the voltage of the non-energized phase when phase energization based on the energization mode is performed from a state in which the brushless motor is stopped at an initial position.

Moreover, in a brushless motor drive method according to the present invention: the brushless motor is stopped at an initial position; a threshold is set, based on a voltage of a non-energized phase when phase energization based on an energization mode is performed from the initial position; and the energization mode is switched based on a result of comparison between the voltage of the non-energized phase and the threshold.

Other objects and features of this invention will be understood from the following description with reference to the accompanying drawings.

BRIEF DESCRIPTION OF THE DRAWINGS

FIG. 34 is a diagram illustrating learning of a threshold for each temperature in the embodiment of the present invention;

FIG. 35 is a diagram illustrating learning of thresholds having a common absolute value in the embodiment of the present invention;

FIG. 36 is a diagram illustrating learning of positive thresholds having a common absolute value and negative thresholds having a common absolute value in the embodiment of the present invention;

DESCRIPTION OF THE PREFERRED EMBODIMENTS

Figure 1:
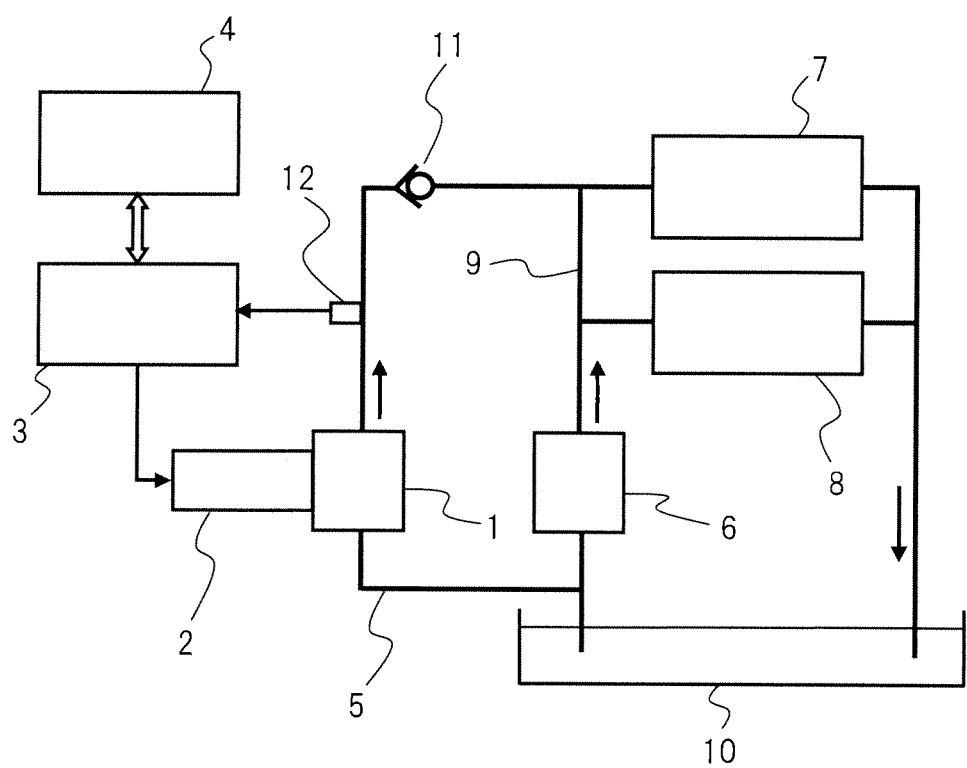
FIG. 1 is a block diagram illustrating a hydraulic system in an embodiment of the present invention.

FIG. 1 is a block diagram illustrating a hydraulic system in a vehicle AT (automatic transmission), to which the brushless motor drive apparatus according to the present invention is applied.

The hydraulic system illustrated in FIG. 1 includes a mechanical oil pump 6 driven by an engine (internal combustion engine) not illustrated and an electric oil pump 1 driven by a motor, as oil pumps for supplying oil to a transmission 7 and an actuator 8.

A control system of the engine has an idle reduction function of stopping the engine when an automatic stop condition is met, and restarting the engine when an automatic start condition is met. While the engine is stopped by idle reduction, mechanical oil pump 6 also stops its operation. Accordingly, the hydraulic system supplies oil to transmission 7 and actuator 8 using electric oil pump 1 during idle reduction.

Electric oil pump 1 is driven by a brushless motor (or stepper motor) 2. Brushless motor 2 is controlled by a motor control device 3 that receives a command from an AT control device 4.

Motor control device 3 controls brushless motor 2 to drive electric oil pump 1, thereby supplying oil in an oil pan 10 to transmission 7 and actuator 8 via oil piping 5.

While the engine is in operation, oil in oil pan 10 is supplied to transmission 7 and actuator 8 via oil piping 9, by mechanical oil pump 6 driven by the engine. During this time, brushless motor 2 is in an off state, and a flow of oil to electric oil pump 1 is blocked by a check valve 11.

When the engine is stopped by idle reduction, an engine rotation speed decreases, and a rotation speed of mechanical oil pump 6 also decreases. This causes a drop in oil pressure of oil piping 9. Accordingly, simultaneously with the idle reduction of the engine, AT control device 4 transmits a motor start command to motor control device 3.

Upon receiving the motor start command, motor control device 3 controls brushless motor 2 to rotate electric oil pump 1, thereby gradually increasing an oil pressure in oil piping 5.

When the oil pressure of mechanical oil pump 6 drops and the oil pressure of electric oil pump 1, which has been suppressed by check valve 11, exceeds a threshold, oil circulates through a path of oil piping 5, electric oil pump 1, check valve 11, transmission 7 or actuator 8, and oil pan 10.

Figure 2:
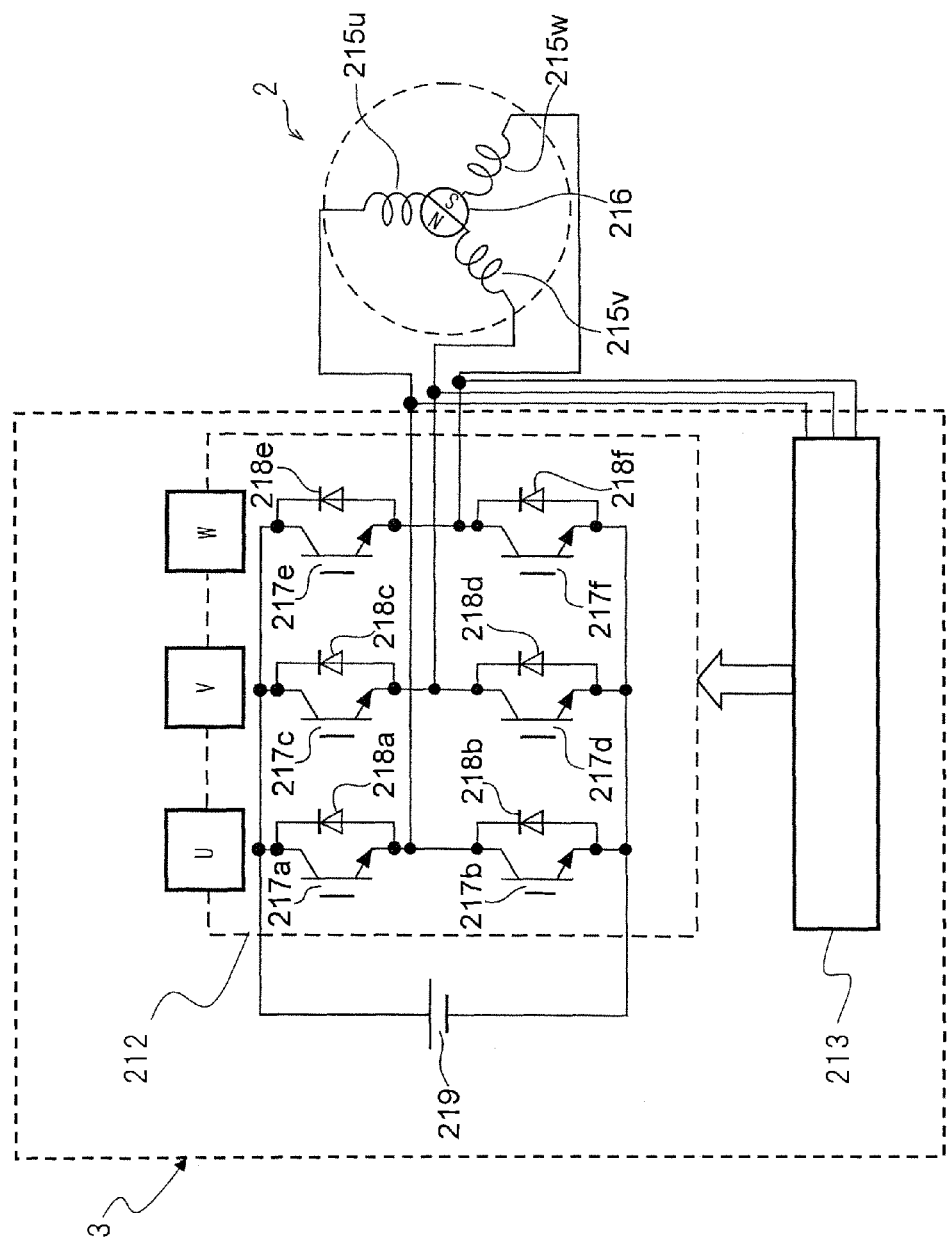
FIG. 2 is a circuit diagram illustrating a control device and a brushless motor in the embodiment of the present invention.

FIG. 2 is a diagram illustrating motor control device 3 and brushless motor 2 in detail.

Motor control device 3 includes a motor drive circuit 212 and a controller 213 that has a microcomputer. Controller 213 performs communication with AT control device 4.

Brushless motor 2 is a three-phase DC brushless motor (three-phase synchronous electric motor). Three phase windings 215$u$, 215$v$, and 215$w$ of a U phase, a V phase, and a W phase are provided in a cylindrical stator not illustrated, and a permanent-magnet rotor 216 is positioned in a space formed at a center of the stator.

Motor drive circuit 212 is formed by three-phase bridge connecting six switching elements 217$a$ to 217$f$ which are each composed of, for example, an IGBT, and also connecting diodes 218$a$ to 218$f$ in anti-parallel respectively to switching elements 217$a$ to 217$f$. Motor drive circuit 212 also has a power supply circuit 219.

Switching elements 217$a$ to 217$f$ have gate terminals connected to controller 213. ON and OFF of switching elements 217$a$ to 217$f$ are duty controlled by controller 213.

Figure 3:
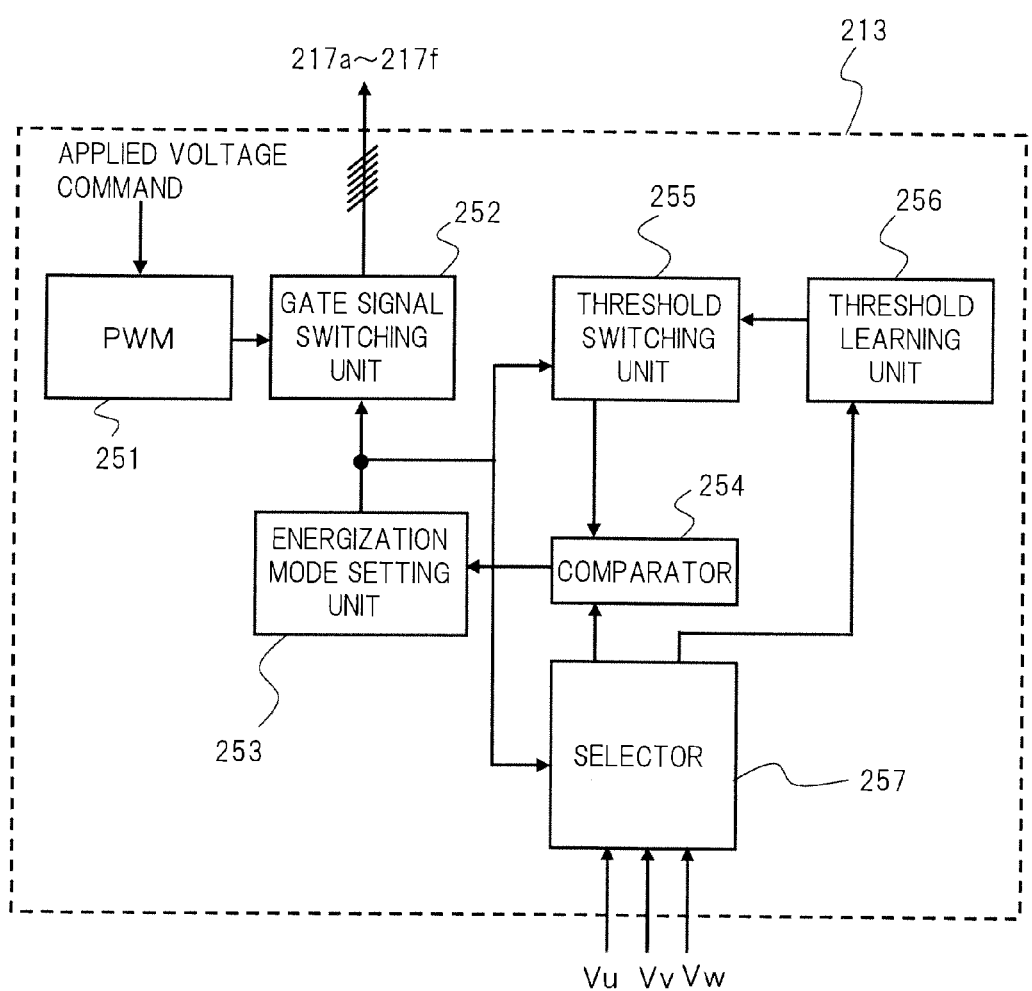
FIG. 3 is a block diagram illustrating a controller in the embodiment of the present invention.

Controller 213 is a circuit that calculates an applied voltage of brushless motor 2 and generates a pulse width modulation (PWM) signal to motor drive circuit 212. As illustrated in FIG. 3, controller 213 includes a PWM generator 251, a gate signal switching unit 252, an energization mode setting unit 253, a comparator 254, a threshold switching unit 255, a threshold learning unit 256, and a selector 257.

PWM generator 251 is a circuit that generates a PWM wave by pulse width modulation, based on an applied voltage command determined according to a command torque.

Energization mode setting unit 253 is a device that sequentially outputs a mode command signal for determining an energization mode of motor drive circuit 212. Energization mode setting unit 253 switches between six energization modes, when triggered by a mode switching trigger signal output from comparator 254.

Gate signal switching unit 252 determines a switching operation of each of switching elements 217$a$ to 217$f$ in motor drive circuit 212, based on the mode command signal output from energization mode setting unit 253. Gate signal switching unit 252 outputs eventual six gate pulse signals to motor drive circuit 212, according to the determination.

Threshold switching unit 255 is a circuit that generates a threshold of a terminal voltage of a non-energized phase. A threshold switching timing is determined based on the mode command signal output from energization mode setting unit 253.

Selector 257 is a circuit that selects, according to the mode command signal, the voltage of the non-energized phase from three phase terminal voltages Vu, Vv, and Vw of brushless motor 2, and outputs the selected voltage. Here, the terminal voltage is output as a potential difference from a neutral point of brushless motor 2.

Comparator 254 compares the threshold output from threshold switching unit 257 and the voltage of the non-energized phase output from selector 257, and outputs the mode switching trigger to energization mode setting unit 253.

Note that the voltage of the non-energized phase is a voltage induced in the non-energized phase by applied pulse voltages of two phases. Since a saturation state of a magnetic circuit changes with a rotor position, the induced voltage corresponding to the rotor position occurs in the non-energized phase. As a result, the rotor position can be estimated from the induced voltage in the non-energized phase, so that an energization mode switching timing can be detected.

Figure 4:
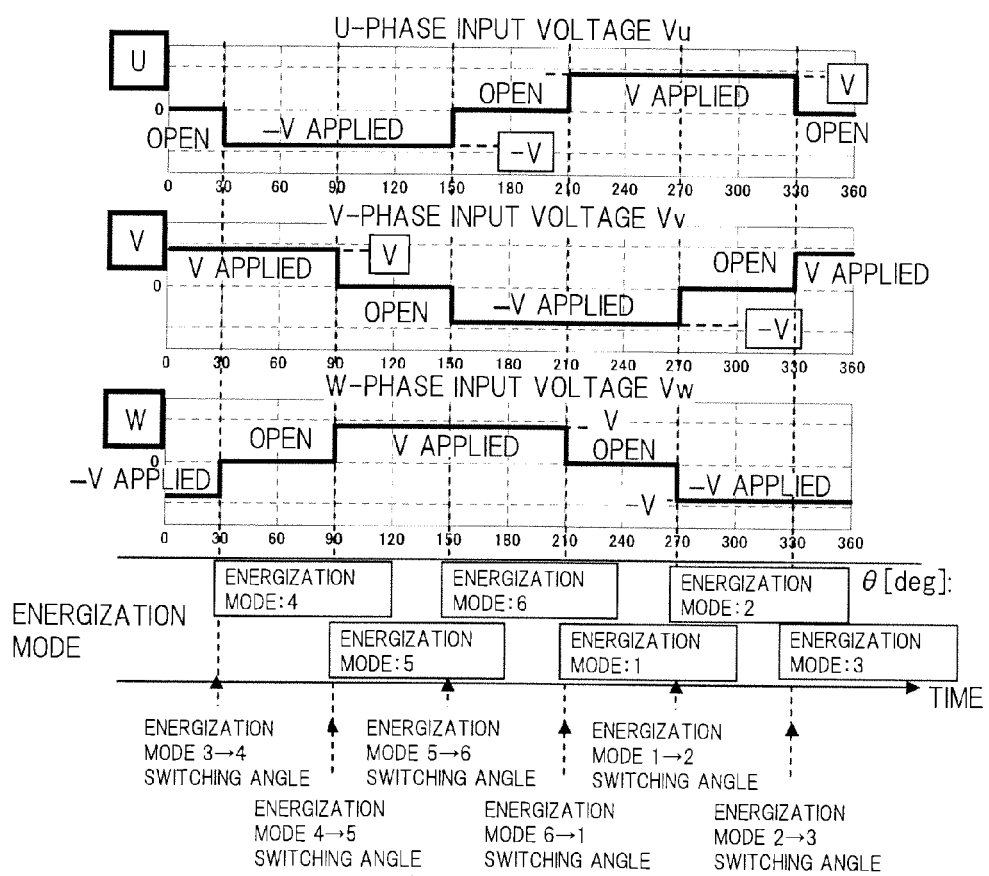
FIG. 4 is a time chart illustrating an energization pattern of the brushless motor in the embodiment of the present invention.

FIG. 4 is a diagram illustrating a voltage applied to each phase, in each energization mode.

The energization mode includes six energization modes (1) to (6) that are switched in turn at an interval of an electrical angle of 60 deg. In each of switching modes (1) to (6), switching elements 217a to 217f are driven by a signal generated by pulse width modulation according to a command voltage.

In this embodiment, using an angular position of a coil of the U phase as a reference position (deg), an angular position of switching from energization mode (3) to energization mode (4) is set to 30 deg, an angular position of switching from energization mode (4) to energization mode (5) is set to 90 deg, an angular position of switching from energization mode (5) to energization mode (6) is set to 150 deg, an angular position of switching from energization mode (6) to energization mode (1) is set to 210 deg, an angular position of switching from energization mode (1) to energization mode (2) is set to 270 deg, and an angular position of switching from energization mode (2) to energization mode (3) is set to 330 deg.

In energization mode (1), switching elements 217a and 217d are ON and all other switching elements are OFF to apply a voltage V to the U phase and a voltage −V to the V phase, thereby causing a current to flow from the U phase to the V phase.

In energization mode (2), switching elements 217a and 217f are ON and all other switching elements are OFF to apply voltage V to the U phase and voltage −V to the W phase, thereby causing a current to flow from the U phase to the W phase.

In energization mode (3), switching elements 217c and 217f are ON and all other switching elements are OFF to apply voltage V to the V phase and voltage −V to the W phase, thereby causing a current to flow from the V phase to the W phase.

In energization mode (4), switching elements 217b and 217c are ON and all other switching elements are OFF to apply voltage V to the V phase and voltage −V to the U phase, thereby causing a current to flow from the V phase to the U phase.

In energization mode (5), switching elements 217b and 217e are ON and all other switching elements are OFF to apply voltage V to the W phase and voltage −V to the U phase, thereby causing a current to flow from the W phase to the U phase.

In energization mode (6), switching elements 217e and 217d are ON and all other switching elements are OFF to apply voltage V to the W phase and voltage −V to the V phase, thereby causing a current to flow from the W phase to the V phase.

Thus, by switching between six energization modes (1) to (6) at an interval of an electrical angle of 60 deg, each of switching elements 217a to 217f is energized for 120 deg, at an interval of 240 deg. Hence, the energization method as illustrated in FIG. 4 is referred to as a 120-degree energization method.

In this embodiment, energization mode switching is performed based on comparison between a voltage generated in the non-energized phase and a threshold. Motor control device 3 in this embodiment carries out what is called "sensorless energization control".

In detail, selector 257 selects the voltage of the non-energized phase from three phase terminal voltages Vu, Vv, and Vw, and outputs the selected voltage. Comparator 254 determines whether or not this terminal voltage of the non-energized phase crosses the threshold output from threshold switching unit 255. When the terminal voltage of the non-energized phase crosses the threshold, comparator 254 outputs a mode switching trigger to energization mode setting unit 253.

Here, the voltage of the non-energized phase varies due to temperature environments, brushless motor 2 (winding) variations, and the like. Thus, if the energization mode switching timing is detected using a predetermined fixed threshold, there is a possibility that the energization mode switching timing deviates from an appropriate timing and step-out of brushless motor 2 occurs.

In view of this, in this embodiment, threshold learning unit 256 for learning the threshold of the voltage is provided to correct the threshold of the voltage to an appropriate value in relation to temperature environments, brushless motor 2 variations, and the like, where the corrected threshold is stored and put to use. The following describes a threshold learning process in threshold learning unit 256 in detail.

Figure 5:
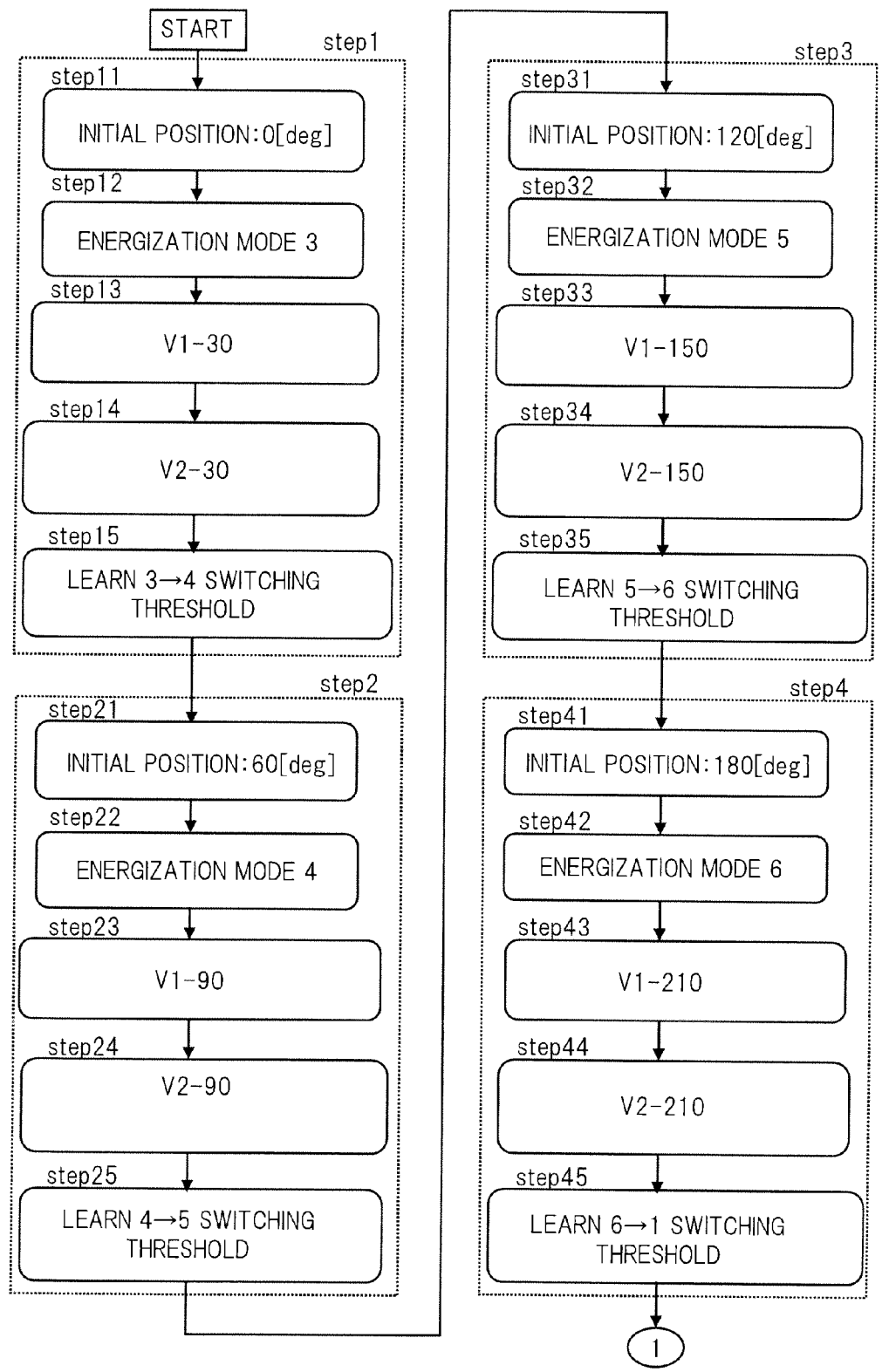
FIG. 5 is a flowchart illustrating threshold learning in the embodiment of the present invention.
Figure 6:
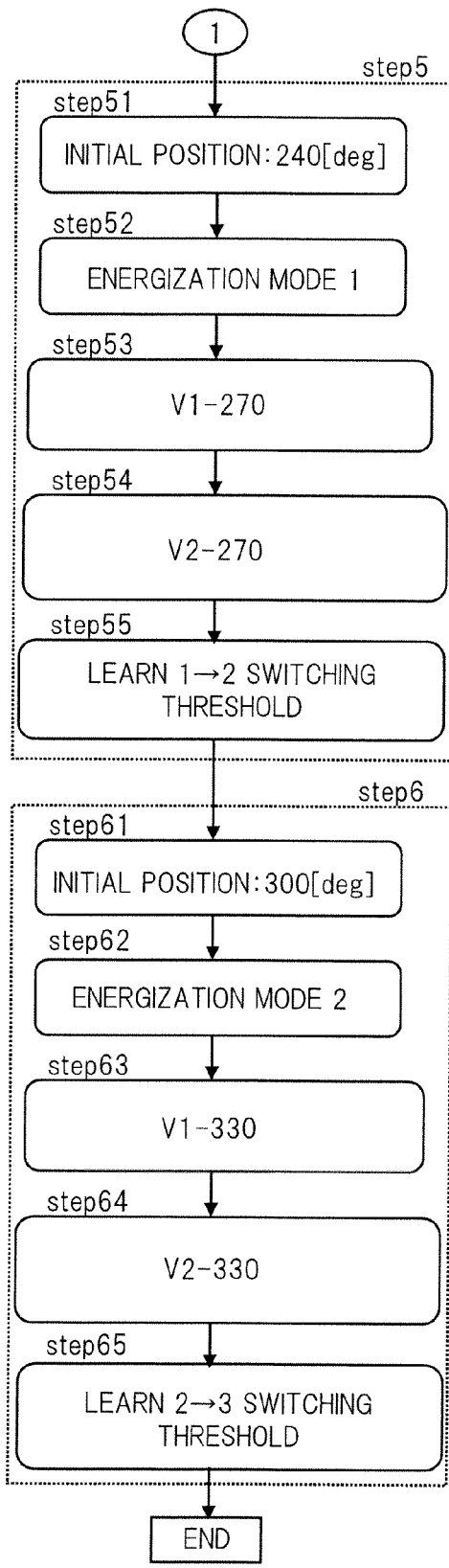
FIG. 6 is a flowchart illustrating threshold learning in the embodiment of the present invention.

A routine illustrated in flowcharts of FIGS. 5 and 6 represents a threshold learning process by controller 213.

In step 1, a threshold used to determine switching from energization mode (3) to energization mode (4) is learned. In step 2, a threshold used to determine switching from energization mode (4) to energization mode (5) is learned. In step 3, a threshold used to determine switching from energization mode (5) to energization mode (6) is learned. In step 4, a threshold used to determine switching from energization mode (6) to energization mode (1) is learned. In step 5, a threshold used to determine switching from energization mode (1) to energization mode (2) is learned. In step 6, a threshold used to determine switching from energization mode (2) to energization mode (3) is learned. Note that the threshold learning order is arbitrary, and may be changed according to need.

In detail, steps 11 to 15 are executed in step 1 of learning a threshold V3-4 used to determine switching from energization mode (3) to energization mode (4).

First, in step 11, permanent-magnet rotor 216 is positioned at an initial position having a set angle of 0 deg.

In detail, applied voltages Vu, Vv, and Vw of the U, V, and W phases are set to Vu=Vin, Vv=−Vin×½, and Vw=−Vin×½, based on a predetermined voltage Vin.

Figure 7A:
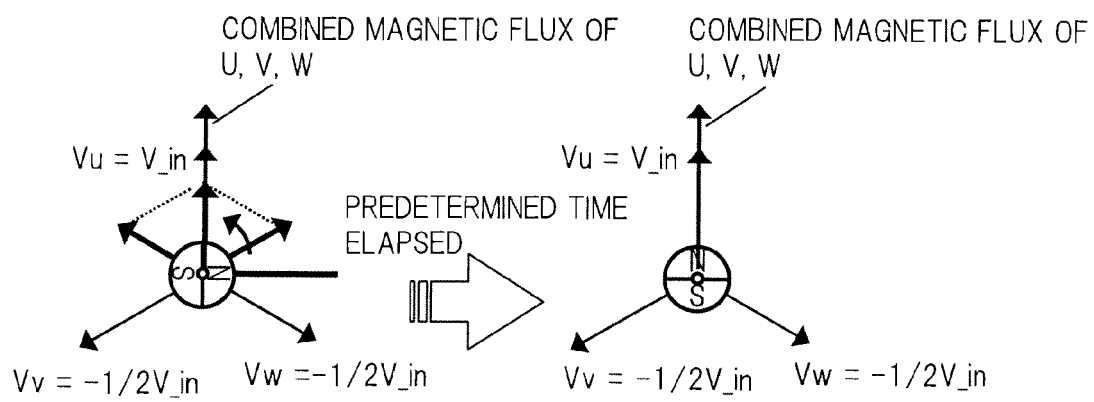
FIG. 7 is a diagram illustrating a state of learning a threshold V3-4 in the embodiment of the present invention.

When the applied voltages of the U, V, and W phases are set in this way, a combined magnetic flux of the U, V, and W phases is generated as illustrated in FIG. 7A. Permanent-magnet rotor 216 is attracted to such a combined magnetic flux. This generates a torque, as a result of which the north pole of permanent-magnet rotor 216 rotates to the set angle of 0 deg.

Note that the initial position is set to 0 deg, which is an angular position 30 deg preceding the angle, i.e., 30 deg, of switching from energization mode (3) to energization mode (4). In the learning in each of steps 2 to 6, too, an initial position is set to an angular position 30 deg preceding the corresponding energization mode switching angle.

In step 12, when a delay time expected to be needed for the north pole of permanent-magnet rotor 216 to reach the set angle elapses after setting applied voltages Vu, Vv, and Vw of the U, V, and W phases in step 11 and so it can be estimated that permanent-magnet rotor 216 stops at the initial position, applied voltages Vu, Vv, and Vw are switched to the applied voltages corresponding to energization mode (3), that is, Vu=0, Vv=Vin, and Vw=−Vin.

Figure 7B:
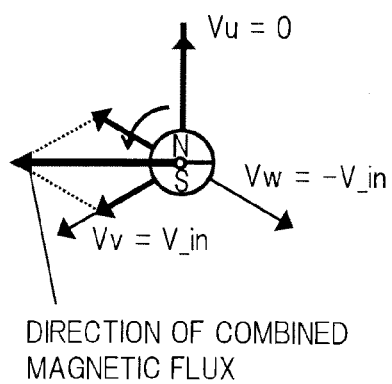

As a result of switching to the applied voltages corresponding to energization mode (3), the combined magnetic flux of the U, V, and W phases changes as illustrated in FIG. 7B. Permanent-magnet rotor 216 is attracted to such a combined magnetic flux. This generates a torque, as a result of which the north pole of permanent-magnet rotor 216 rotates from the initial position to an angle of 90 deg corresponding to energization mode (3).

Figure 8A:
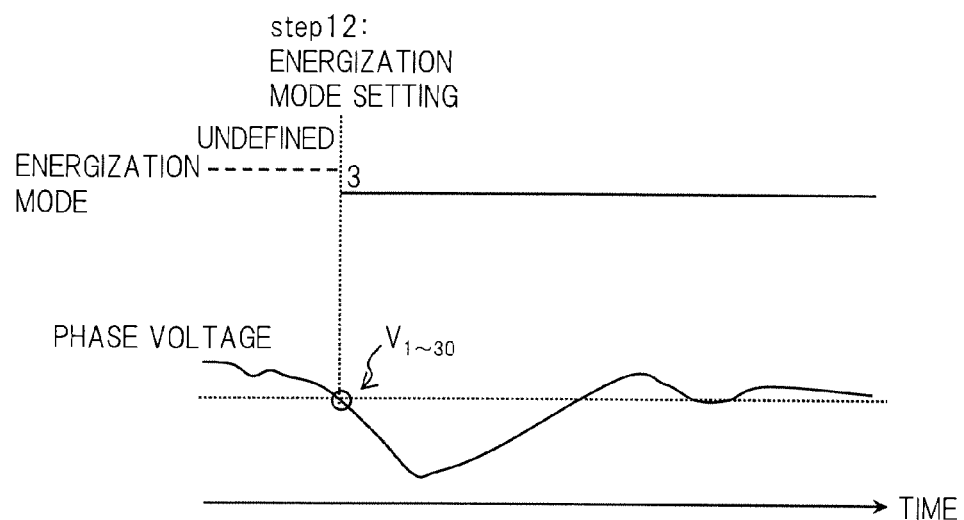
FIG. 8 is a time chart illustrating a voltage change of a non-energized phase when learning threshold V3-4 in the embodiment of the present invention.

In step 13, terminal voltage Vu of the U phase, which is the non-energized phase in energization mode (3), immediately after switching from the applied voltages for setting at the initial position to the applied voltages corresponding to energization mode (3) is stored as a voltage V1-30, as illustrated in FIG. 8A.

Figure 8B:
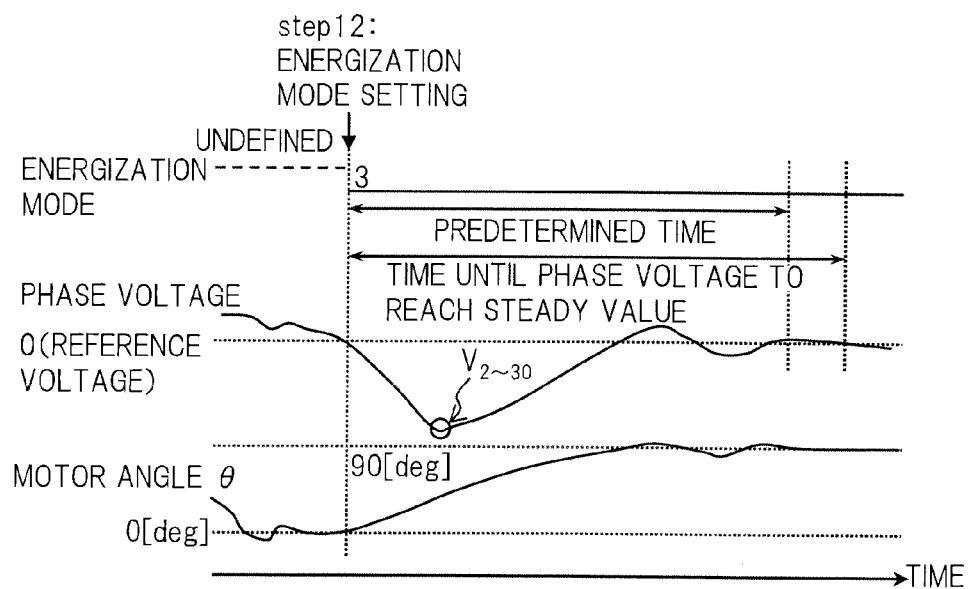

In step 14, a minimum value of terminal voltage Vu of the U phase in a period until a set time elapses after the applied voltages are switched to the applied voltages corresponding to energization mode (3) is detected and stored as a voltage V2-30, as illustrated in FIG. 8B.

Terminal voltage Vu of the U phase decreases as a result of switching to the applied voltages corresponding to energization mode (3), and then increases and converges to a steady voltage. Based on such characteristics, the set time is adjusted beforehand as a sufficient time for detecting the minimum voltage.

Note that, instead of specifying the minimum voltage detection period by time, a point at which the convergence of terminal voltage Vu of the U phase to the steady state is detected may be used as an end of the minimum voltage detection period.

In step 15, threshold V3-4 used to determine switching from energization mode (3) to energization mode (4) is calculated according to the following equation (1) or (2).

$$(\text{threshold } V3\text{-}4) = K \times ((\text{voltage } V2\text{-}30) - (\text{voltage } V1\text{-}30)) \quad \text{Equation (1):}$$

$$(\text{threshold } V3\text{-}4) = K \times ((\text{voltage } V2\text{-}30) - (\text{reference voltage})) \quad \text{Equation (2):}$$

In equations (1) and (2), K is a gain, where K=½ as an example. The reference voltage in equation (2) is 0 V or (power voltage)/2, as an example.

The angle of switching from energization mode (3) to energization mode (4) is 30 deg. In an energization state of energization mode (3), terminal voltage Vu of the U phase at the angle of 30 deg is estimated based on a change in terminal voltage Vu when brushless motor 2 rotates from 0 deg to 90 deg by energization in energization mode (3).

Here, terminal voltage Vu of the U phase decreases to the negative side with energization stop, and then increases and converges to about the reference voltage. The motor angle changes from 0 deg to 90 deg during this time, and also the timing of the minimum value exceeds the angle of 30 deg. Accordingly, gain K is adjusted beforehand by experiment and simulation so that terminal voltage Vu of the U phase at about the angle of 30 deg can be estimated with reference to the minimum voltage.

In other words, the terminal voltage of the non-energized phase at 30 deg, which is the angle of switching from energization mode (3) to energization mode (4), can be determined by specifying beforehand the angle at which the terminal voltage of the non-energized phase is a minimum value. This terminal voltage of the non-energized phase at 30 deg is learned as threshold V3-4 used to determine switching from energization mode (3) to energization mode (4).

Threshold V3-4 calculated in step 15 this time is stored over a previously stored value of threshold V3-4, thereby updating threshold V3-4. When driving brushless motor 2, the timing of switching from energization mode (3) to energization mode (4) is determined based on this updated threshold V3-4.

In the determination of the timing of switching from energization mode (3) to energization mode (4), the motor angle is estimated at about 30 deg when, during energization in energization mode (3), terminal voltage Vu of the U phase which is the non-energized phase becomes lower than threshold V3-4. At this point, the energization mode is switched from (3) to (4).

For example, a threshold V may be updated and stored by taking a weighted average of a previously stored value and newly calculated threshold V and storing the weighted average as threshold V used to determine an energization mode switching timing.

In the case in which newly calculated threshold V is not within a normal range including a standard value, the previously stored value of threshold V is retained without being updated.

Moreover, a design value is stored as an initial value of threshold V, and the energization mode switching timing is determined using the initial value as threshold V when no threshold learning has been performed yet.

The following describes learning of a threshold V4-5 used to determine switching from energization mode (4) to energization mode (5) in step 2, in detail.

First, in step 21, permanent-magnet rotor 216 is positioned at an initial position having a set angle of 60 deg.

In detail, applied voltages Vu, Vv, and Vw of the U, V, and W phases are set to Vu=Vin×½, Vv=Vin×½, and Vw=−Vin, based on predetermined voltage Vin.

Figure 9A:
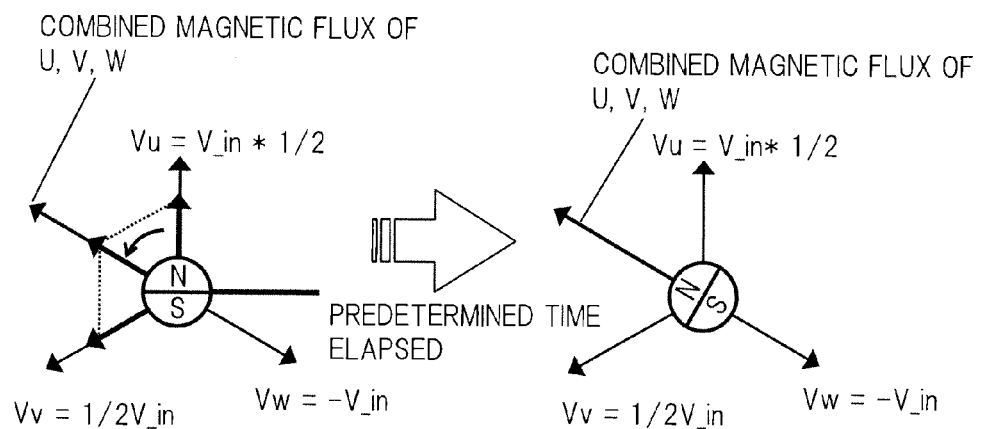
FIG. 9 is a diagram illustrating a state of learning a threshold V4-5 in the embodiment of the present invention.

When the applied voltages of the U, V, and W phases are set in this way, a combined magnetic flux of the U, V, and W phases is generated as illustrated in FIG. 9A. Permanent-magnet rotor 216 is attracted to such a combined magnetic flux. This generates a torque, as a result of which the north pole of permanent-magnet rotor 216 rotates to the set angle of 60 deg.

In step 22, when a delay time expected to be needed for the north pole of permanent-magnet rotor 216 to reach the set angle elapses after setting applied voltages Vu, Vv, and Vw of the U, V, and W phases in step 21 and so it can be estimated that permanent-magnet rotor 216 stops at the initial position, applied voltages Vu, Vv, and Vw are switched to the applied voltages corresponding to energization mode (4), that is, Vu=−Vin, Vv=Vin, and Vw=0.

Figure 9B:
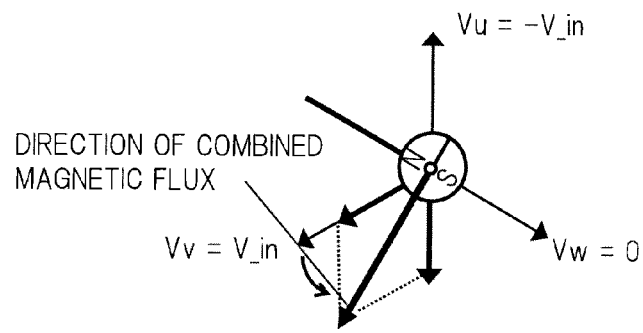

As a result of switching to the applied voltages corresponding to energization mode (4), the combined magnetic flux of the U, V, and W phases changes as illustrated in FIG. 9B. Permanent-magnet rotor 216 is attracted to such a combined magnetic flux. This generates a torque, as a result of which the north pole of permanent-magnet rotor 216 rotates from the initial position to an angle of 150 deg corresponding to energization mode (4).

Figure 10A:
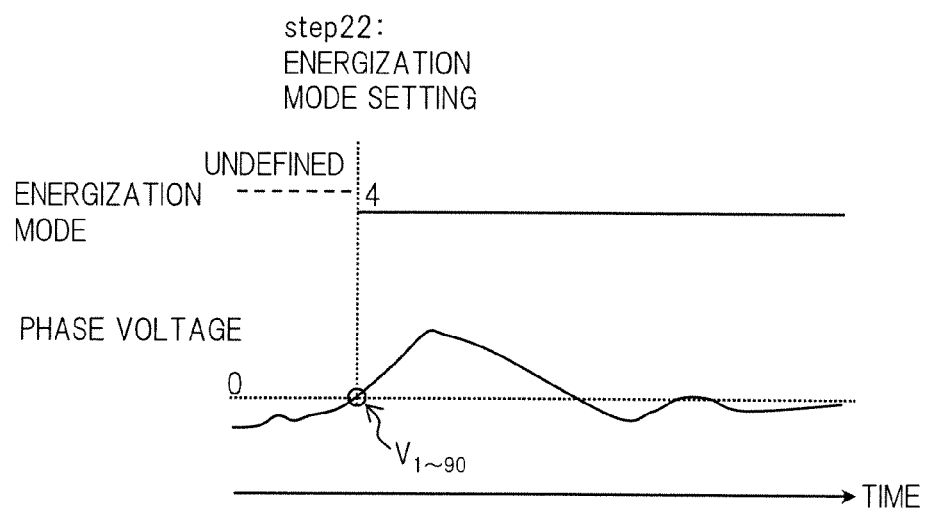
FIG. 10 is a time chart illustrating a voltage change of a non-energized phase when learning threshold V4-5 in the embodiment of the present invention.

In step 23, terminal voltage Vw of the W phase, which is the non-energized phase in energization mode (4), immediately after switching from the applied voltages for setting at the initial position to the applied voltages corresponding to energization mode (4) is stored as a voltage V1-90, as illustrated in FIG. 10A.

Figure 10B:
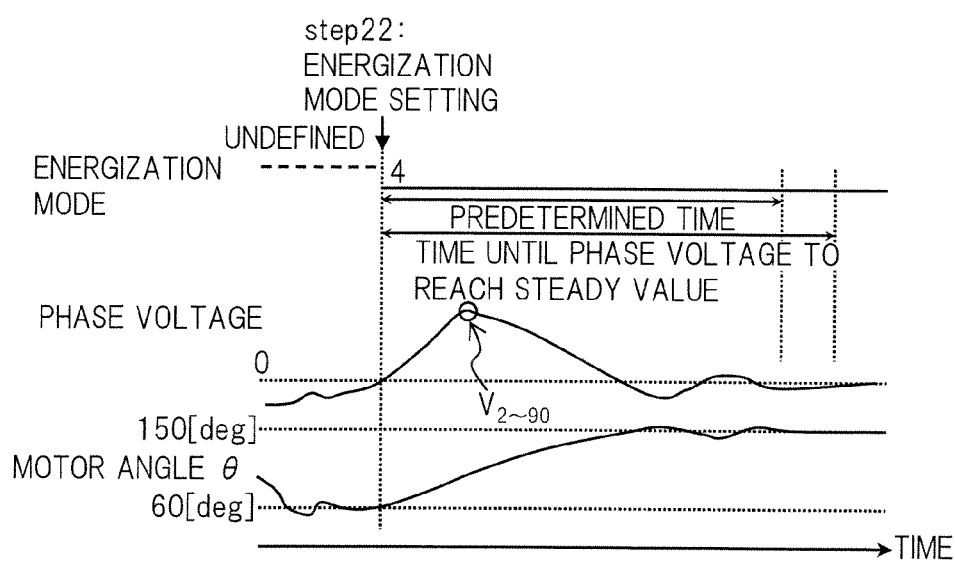

In step 24, a maximum value of terminal voltage Vw of the W phase in a period until a set time elapses after the applied voltages are switched to the applied voltages corresponding to energization mode (4) is detected and stored as a voltage V2-90, as illustrated in FIG. 10B.

Terminal voltage Vw of the W phase increases as a result of switching to the applied voltages corresponding to energization mode (4), and then decreases and converges to the steady voltage. Based on such characteristics, the set time is adjusted beforehand as a sufficient time for detecting the maximum voltage.

Note that, instead of specifying the maximum voltage detection period by time, a point at which the convergence of terminal voltage Vw of the W phase to the steady state is detected may be used as an end of the maximum voltage detection period.

In step 25, threshold V4-5 used to determine switching from energization mode (4) to energization mode (5) is calculated according to the following equation (3) or (4).

$$(\text{threshold } V\text{4-5}) = K \times ((\text{voltage } V\text{2-90}) - (\text{voltage } V\text{1-90})) \quad \text{Equation (3)}:$$

$$(\text{threshold } V\text{4-5}) = K \times ((\text{voltage } V\text{2-90}) - (\text{reference voltage})) \quad \text{Equation (4)}:$$

In equations (3) and (4), K is a gain, where K=½ as an example. The reference voltage in equation (4) is 0 V or (power voltage)/2, as an example.

The angle of switching from energization mode (4) to energization mode (5) is 90 deg. In an energization state of energization mode (4), terminal voltage Vw of the W phase at the angle of 90 deg is estimated based on a change in terminal voltage Vw when brushless motor 2 rotates from 60 deg to 150 deg by energization in energization mode (4).

Here, terminal voltage Vw of the W phase increases to the positive side with energization stop, and then decreases and converges to about the reference voltage. The motor angle changes from 60 deg to 150 deg during this time, and also the timing of the maximum value exceeds the angle of 90 deg. Accordingly, gain K is adjusted beforehand by experiment and simulation so that terminal voltage Vw of the W phase at about the angle of 90 deg can be estimated with reference to the maximum voltage.

In other words, the terminal voltage of the non-energized phase at 90 deg, which is the angle of switching from energization mode (4) to energization mode (5), can be determined by specifying beforehand the angle at which the terminal voltage of the non-energized phase is a maximum value. This terminal voltage of the non-energized phase at 90 deg is learned as threshold V4-5 used to determine switching from energization mode (4) to energization mode (5).

Threshold V4-5 calculated in step 25 this time is stored over a previously stored value of threshold V4-5, thereby updating threshold V4-5. When driving brushless motor 2, the timing of switching from energization mode (4) to energization mode (5) is determined based on this updated threshold V4-5.

In the determination of the timing of switching from energization mode (4) to energization mode (5), the motor angle is estimated at about 90 deg when, during energization in energization mode (4), terminal voltage Vw of the W phase becomes higher than threshold V4-5. At this point, the energization mode is switched from (4) to (5).

The following describes learning of a threshold V5-6 used to determine switching from energization mode (5) to energization mode (6) in step 3, in detail.

First, in step 31, permanent-magnet rotor 216 is positioned at an initial position having a set angle of 120 deg.

In detail, applied voltages Vu, Vv, and Vw of the U, V, and W phases are set to Vu=−Vin×½, Vv=Vin, and Vw=−Vin×½, based on predetermined voltage Vin.

Figure 11A:
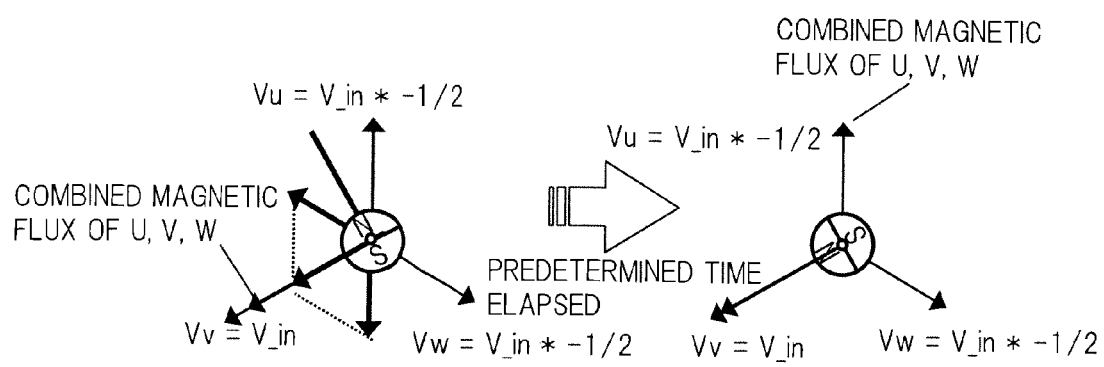
FIG. 11 is a diagram illustrating a state of learning a threshold V5-6 in the embodiment of the present invention.

When the applied voltages of the U, V, and W phases are set in this way, a combined magnetic flux of the U, V, and W phases is generated as illustrated in FIG. 11A. Permanent-magnet rotor 216 is attracted to such a combined magnetic flux. This generates a torque, as a result of which the north pole of permanent-magnet rotor 216 rotates to the set angle of 120 deg.

In step 32, when a delay time expected to be needed for the north pole of permanent-magnet rotor 216 to reach the set angle elapses after setting applied voltages Vu, Vv, and Vw of the U, V, and W phases in step 31 and it can be estimated that permanent-magnet rotor 216 stops at the initial position, applied voltages Vu, Vv, and Vw are switched to the applied voltages corresponding to energization mode (5), that is, Vu=−Vin, Vv=0, and Vw=Vin.

Figure 11B:
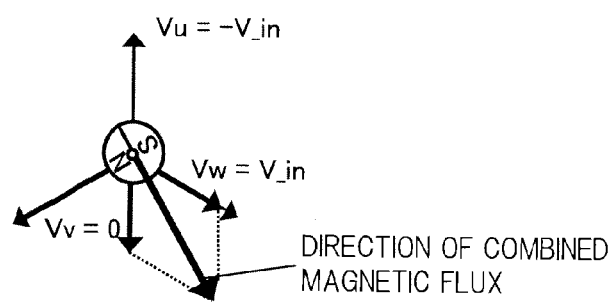

As a result of switching to the applied voltages corresponding to energization mode (5), the combined magnetic flux of the U, V, and W phases changes as illustrated in FIG. 11B. Permanent-magnet rotor 216 is attracted to such a combined magnetic flux. This generates a torque, as a result of which the north pole of permanent-magnet rotor 216 rotates from the initial position to an angle of 210 deg corresponding to energization mode (5).

Figure 12A:
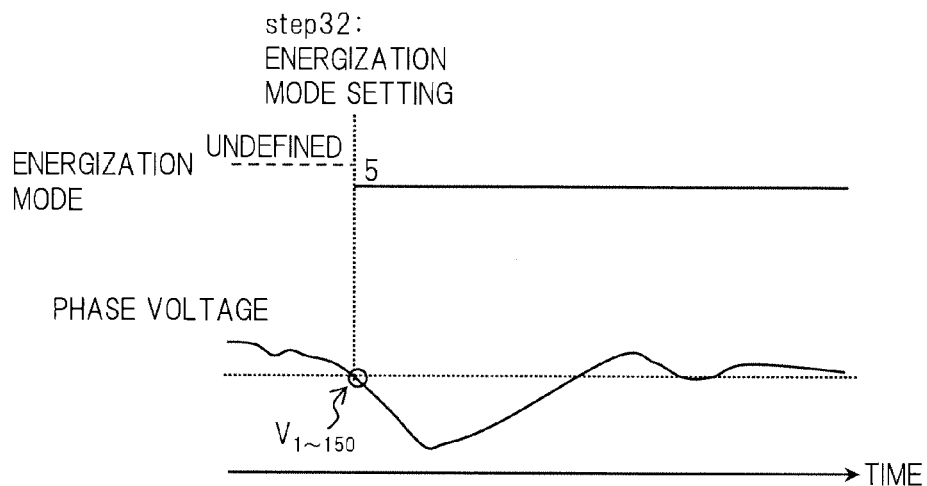
FIG. 12 is a time chart illustrating a voltage change of a non-energized phase when learning threshold V5-6 in the embodiment of the present invention.

In step 33, terminal voltage Vv of the V phase, which is the non-energized phase in energization mode (5), immediately after switching from the applied voltages for setting at the initial position to the applied voltages corresponding to energization mode (5) is stored as a voltage V1-150, as illustrated in FIG. 12A.

Figure 12B:
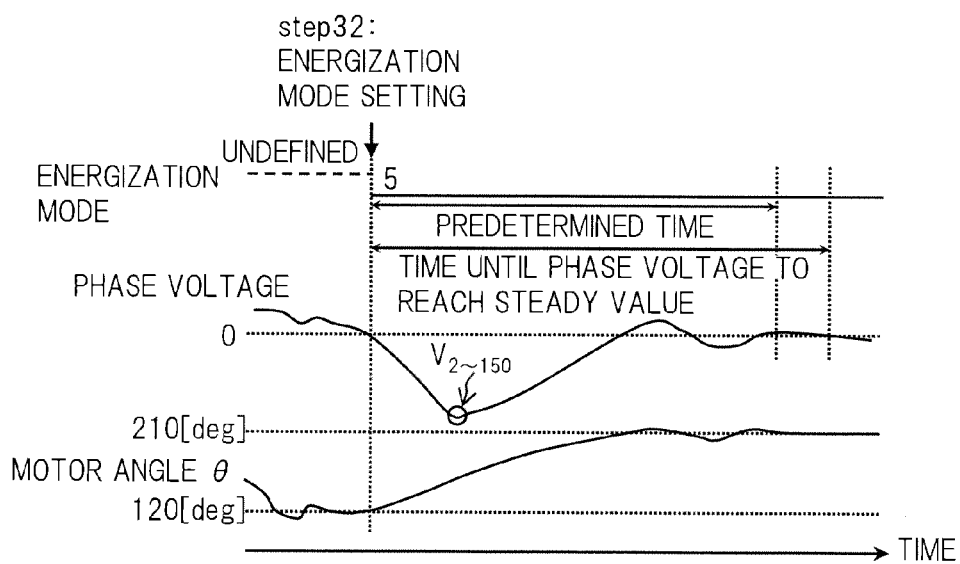

In step 34, a minimum value of terminal voltage Vv of the V phase in a period until a set time elapses after the applied voltages are switched to the applied voltages corresponding to energization mode (5) is detected and stored as a voltage V2-150, as illustrated in FIG. 12B.

Terminal voltage Vv of the V phase decreases as a result of switching to the applied voltages corresponding to energization mode (5), and then increases and converges to the steady voltage. Based on such characteristics, the set time is adjusted beforehand as a sufficient time for detecting the minimum voltage.

Note that, instead of specifying the minimum voltage detection period by time, a point at which the convergence of terminal voltage Vv of the V phase to the steady state is detected may be used as an end of the minimum voltage detection period.

In step 35, threshold V5-6 used to determine switching from energization mode (5) to energization mode (6) is calculated according to the following equation (5) or (6).

$$(\text{threshold } V\text{5-6}) = K \times ((\text{voltage } V\text{2-150}) - (\text{voltage } V\text{1-150})) \quad \text{Equation (5)}:$$

$$(\text{threshold } V\text{5-6}) = K \times ((\text{voltage } V\text{2-150}) - (\text{reference voltage})) \quad \text{Equation (6)}:$$

In equations (5) and (6), K is a gain, where K=½ as an example. The reference voltage in equation (6) is 0 V or (power voltage)/2, as an example.

The angle of switching from energization mode (5) to energization mode (6) is 150 deg. In an energization state of energization mode (5), terminal voltage Vv of the V phase at the angle of 150 deg is estimated based on a change in terminal voltage Vv when brushless motor 2 rotates from 120 deg to 210 deg by energization in energization mode (5).

Here, terminal voltage Vv of the V phase decreases to the negative side with energization stop, and then increases and converges to about the reference voltage. The motor angle changes from 120 deg to 210 deg during this time, and also the timing of the minimum value exceeds the angle of 150 deg. Accordingly, gain K is adjusted beforehand by experiment and simulation so that terminal voltage Vv of the V phase at about the angle of 150 deg can be estimated with reference to the minimum voltage.

In other words, the terminal voltage of the non-energized phase at 150 deg, which is the angle of switching from energization mode (5) to energization mode (6), can be determined by specifying beforehand the angle at which the terminal voltage of the non-energized phase is a minimum value. This terminal voltage of the non-energized phase at 150 deg is learned as threshold V5-6 used to determine switching from energization mode (5) to energization mode (6).

Threshold V5-6 calculated in step 35 this time is stored over a previously stored value of threshold V5-6, thereby updating threshold V5-6. When driving brushless motor 2, the timing of switching from energization mode (5) to energization mode (6) is determined based on this updated threshold V5-6.

In the determination of the timing of switching from energization mode (5) to energization mode (6), the motor angle is estimated at about 150 deg when, during energization in energization mode (5), terminal voltage Vv of the V phase becomes lower than threshold V5-6. At this point, the energization mode is switched from (5) to (6).

The following describes learning of a threshold V6-1 used to determine switching from energization mode (6) to energization mode (1) in step 4, in detail.

First, in step 41, permanent-magnet rotor 216 is positioned at an initial position having a set angle of 180 deg.

In detail, applied voltages Vu, Vv, and Vw of the U, V, and W phases are set to Vu=−Vin, Vv=Vin×½, and Vw=Vin×½, based on predetermined voltage Vin.

Figure 13A:
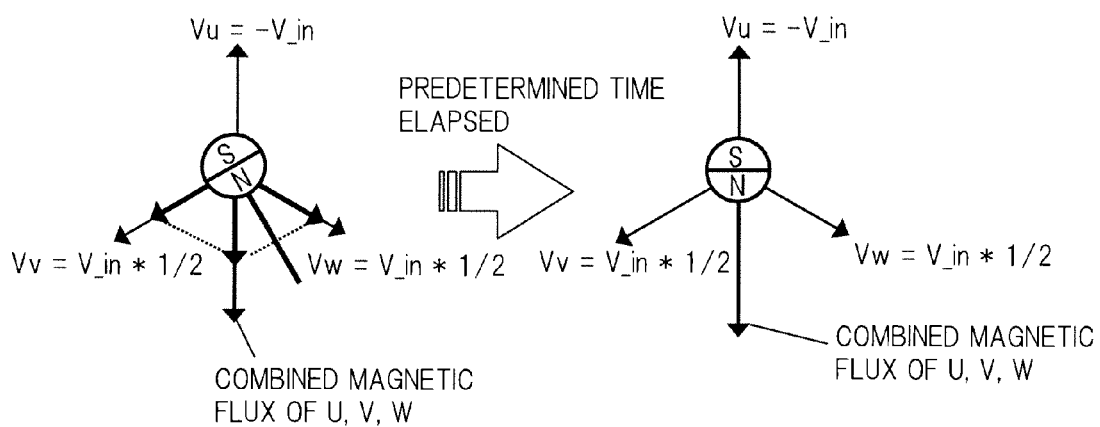
FIG. 13 is a diagram illustrating a state of learning a threshold V6-1 in the embodiment of the present invention.

When the applied voltages of the U, V, and W phases are set in this way, a combined magnetic flux of the U, V, and W phases is generated as illustrated in FIG. 13A. Permanent-magnet rotor 216 is attracted to such a combined magnetic flux. This generates a torque, as a result of which the north pole of permanent-magnet rotor 216 rotates to the set angle of 180 deg.

In step 42, when a delay time expected to be needed for the north pole of permanent-magnet rotor 216 to reach the set angle elapses after setting applied voltages Vu, Vv, and Vw of the U, V, and W phases in step 41 and it can be estimated that permanent-magnet rotor 216 stops at the initial position, applied voltages Vu, Vv, and Vw are switched to the applied voltages corresponding to energization mode (6), that is, Vu=0, Vv=−Vin, and Vw=Vin.

Figure 13B:
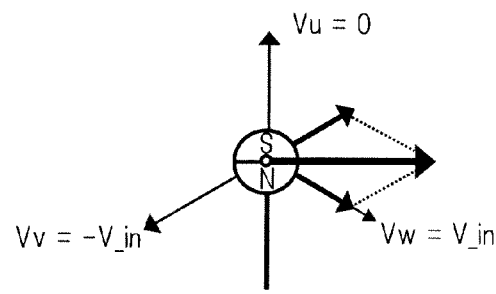

As a result of switching to the applied voltages corresponding to energization mode (6), the combined magnetic flux of the U, V, and W phases changes as illustrated in FIG. 13B. Permanent-magnet rotor 216 is attracted to such a combined magnetic flux. This generates a torque, as a result of which the north pole of permanent-magnet rotor 216 rotates from the initial position to an angle of 270 deg corresponding to energization mode (6).

Figure 14A:
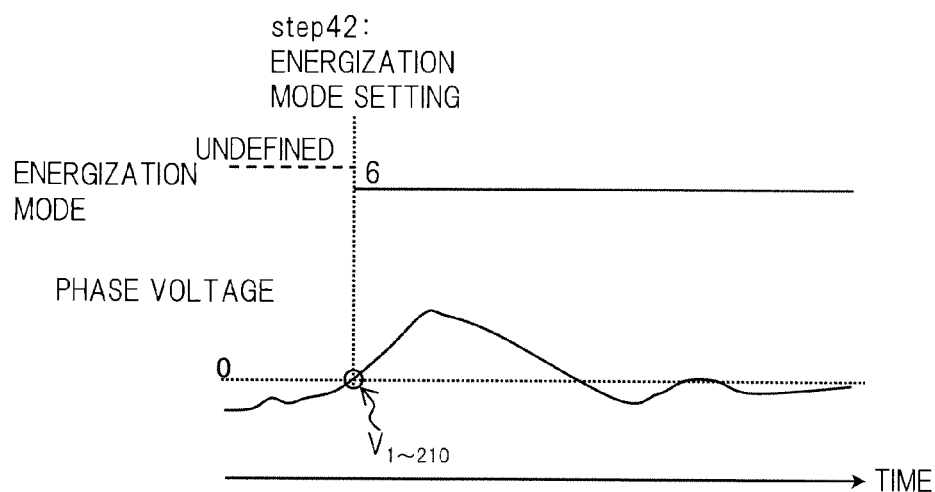
FIG. 14 is a time chart illustrating a voltage change of a non-energized phase when learning threshold V6-1 in the embodiment of the present invention.

In step 43, terminal voltage Vu of the U phase, which is the non-energized phase in energization mode (6), immediately after switching from the applied voltages for setting at the initial position to the applied voltages corresponding to energization mode (6) is stored as a voltage V1-210, as illustrated in FIG. 14A.

Figure 14B:
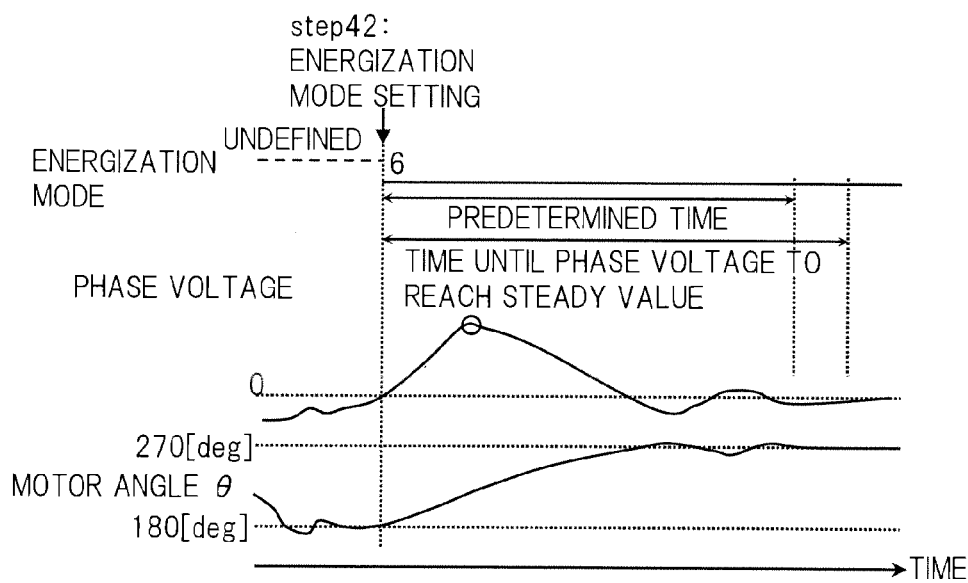

In step 44, a maximum value of terminal voltage Vu of the U phase in a period until a set time elapses after the applied voltages are switched to the applied voltages corresponding to energization mode (6) is detected and stored as a voltage V2-210, as illustrated in FIG. 14B.

Terminal voltage Vu of the U phase increases as a result of switching to the applied voltages corresponding to energization mode (6), and then decreases and converges to the steady voltage. Based on such characteristics, the set time is adjusted beforehand as a sufficient time for detecting the maximum voltage.

Note that, instead of specifying the maximum voltage detection period by time, a point at which the convergence of terminal voltage Vu of the U phase to the steady state is detected may be used as an end of the maximum voltage detection period.

In step 45, threshold V6-1 used to determine switching from energization mode (6) to energization mode (1) is calculated according to the following equation (7) or (8).

$$(\text{threshold } V6\text{-}1) = K \times ((\text{voltage } V2\text{-}210) - (\text{voltage } V1\text{-}210)) \quad \text{Equation (7):}$$

$$(\text{threshold } V6\text{-}1) = K \times ((\text{voltage } V2\text{-}210) - (\text{reference voltage})) \quad \text{Equation (8):}$$

In equations (7) and (8), K is a gain, where K=½ as an example. The reference voltage in equation (8) is 0 V or (power voltage)/2, as an example.

The angle of switching from energization mode (6) to energization mode (1) is 210 deg. In an energization state of energization mode (6), terminal voltage Vu of the U phase at the angle of 210 deg is estimated based on a change in terminal voltage Vu when brushless motor 2 rotates from 180 deg to 270 deg by energization in energization mode (6).

Here, terminal voltage Vu of the U phase increases to the positive side with energization stop, and then decreases and converges to about the reference voltage. The motor angle changes from 180 deg to 270 deg during this time, and also the timing of the maximum value exceeds the angle of 210 deg. Accordingly, gain K is adjusted beforehand by experiment and simulation so that terminal voltage Vu of the U phase at about the angle of 210 deg can be estimated with reference to the maximum voltage.

In other words, the terminal voltage of the non-energized phase at 210 deg, which is the angle of switching from energization mode (6) to energization mode (1), can be determined by specifying beforehand the angle at which the terminal voltage of the non-energized phase is a maximum value. This terminal voltage of the non-energized phase at 210 deg is learned as threshold V6-1 used to determine switching from energization mode (6) to energization mode (1).

Threshold V6-1 calculated in step 45 this time is stored over a previously stored value of threshold V6-1, thereby updating threshold V6-1. When driving brushless motor 2, the timing of switching from energization mode (6) to energization mode (1) is determined based on this updated threshold V6-1.

In the determination of the timing of switching from energization mode (6) to energization mode (1), the motor angle is estimated at about 210 deg when, during energization in energization mode (6), terminal voltage Vu of the U phase becomes higher than threshold V6-1. At this point, the energization mode is switched from (6) to (1).

The following describes learning of a threshold V1-2 used to determine switching from energization mode (1) to energization mode (2) in step 5, in detail.

First, in step 51, permanent-magnet rotor 216 is positioned at an initial position having a set angle of 240 deg.

In detail, applied voltages Vu, Vv, and Vw of the U, V, and W phases are set to Vu=−Vin×½, Vv=−Vin×½, and Vw=Vin, based on predetermined voltage Vin.

Figure 15A:
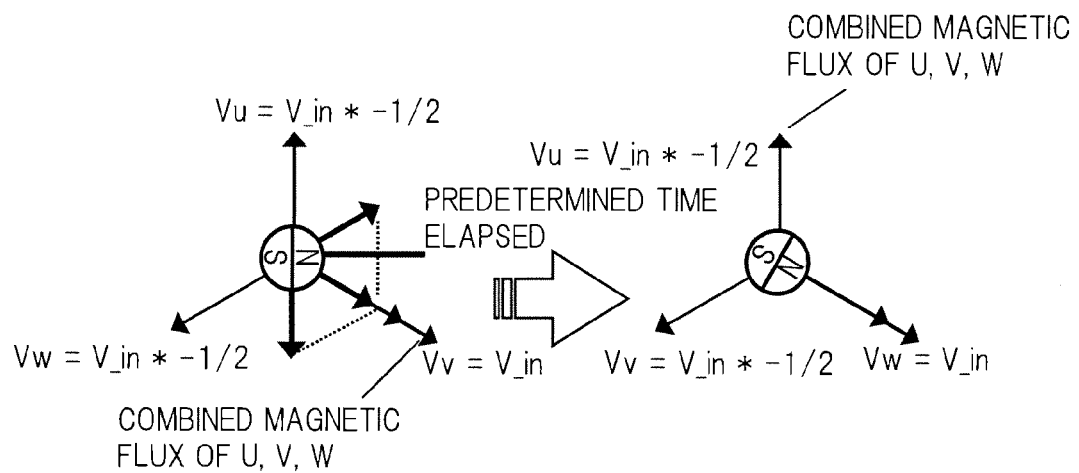
FIG. 15 is a diagram illustrating a state of learning a threshold V1-2 in the embodiment of the present invention.

When the applied voltages of the U, V, and W phases are set in this way, a combined magnetic flux of the U, V, and W phases is generated as illustrated in FIG. 15A. Permanent-magnet rotor 216 is attracted to such a combined magnetic flux. This generates a torque, as a result of which the north pole of permanent-magnet rotor 216 rotates to the set angle of 240 deg.

In step 52, when a delay time expected to be needed for the north pole of permanent-magnet rotor 216 to reach the set angle elapses after setting applied voltages Vu, Vv, and Vw of the U, V, and W phases in step 51 and it can be estimated that permanent-magnet rotor 216 stops at the initial position, applied voltages Vu, Vv, and Vw are switched to the applied voltages corresponding to energization mode (1), that is, Vu=Vin, Vv=−Vin, and Vw=0.

Figure 15B:
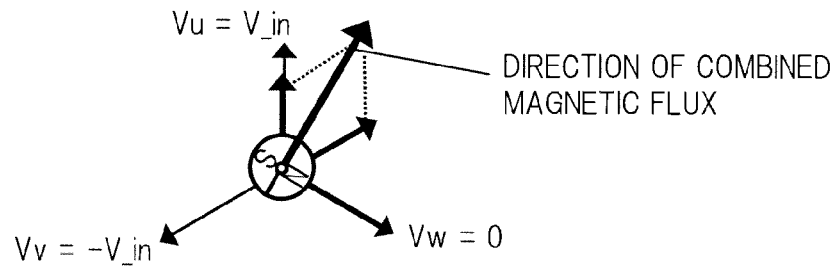

As a result of switching to the applied voltages corresponding to energization mode (1), the combined magnetic flux of the U, V, and W phases changes as illustrated in FIG. 15B. Permanent-magnet rotor 216 is attracted to such a combined magnetic flux. This generates a torque, as a result of which the north pole of permanent-magnet rotor 216 rotates from the initial position to an angle of 330 deg corresponding to energization mode (1).

Figure 16A:
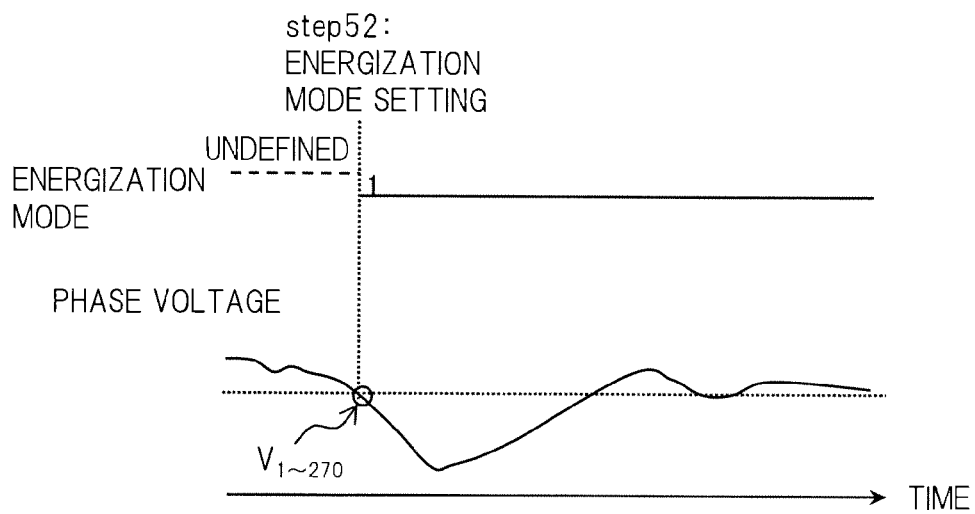
FIG. 16 is a time chart illustrating a voltage change of a non-energized phase when learning threshold V1-2 in the embodiment of the present invention.

In step 53, terminal voltage Vw of the W phase, which is the non-energized phase in energization mode (1), immediately after switching from the applied voltages for setting at the initial position to the applied voltages corresponding to energization mode (1) is stored as a voltage V1-270, as illustrated in FIG. 16A.

Figure 16B:
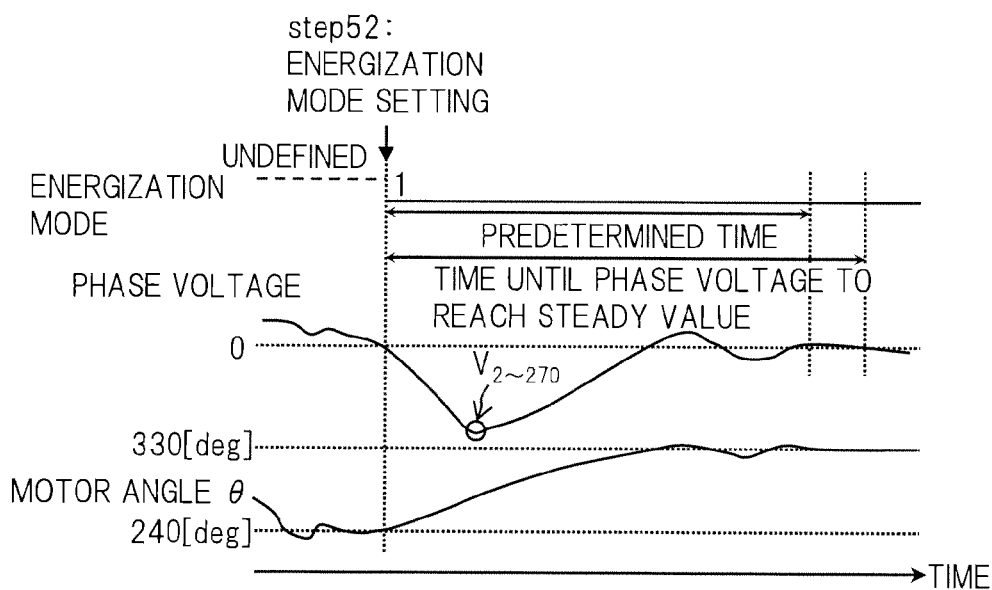

In step 54, a minimum value of terminal voltage Vw of the W phase in a period until a set time elapses after the applied voltages are switched to the applied voltages corresponding to energization mode (1) is detected and stored as a voltage V2-270, as illustrated in FIG. 16B.

Terminal voltage Vw of the W phase decreases as a result of switching to the applied voltages corresponding to energization mode (1), and then increases and converges to the steady voltage. Based on such characteristics, the set time is adjusted beforehand as a sufficient time for detecting the minimum voltage.

Note that, instead of specifying the minimum voltage detection period by time, a point at which the convergence of terminal voltage Vw of the W phase to the steady state is detected may be used as an end of the minimum voltage detection period.

In step 55, threshold V1-2 used to determine switching from energization mode (1) to energization mode (2) is calculated according to the following equation (9) or (10).

$$(\text{threshold } V1\text{-}2) = K \times ((\text{voltage } V2\text{-}270) - (\text{voltage } V1\text{-}270)) \quad \text{Equation (9):}$$

$$(\text{threshold } V1\text{-}2) = K \times ((\text{voltage } V2\text{-}270) - (\text{reference voltage})) \quad \text{Equation (10):}$$

In equations (9) and (10), K is a gain, where K=½ as an example. The reference voltage in equation (10) is 0 V or (power voltage)/2, as an example.

The angle of switching from energization mode (1) to energization mode (2) is 270 deg. In an energization state of energization mode (1), terminal voltage Vw of the W phase at the angle of 270 deg is estimated based on a change in terminal voltage Vw when brushless motor 2 rotates from 240 deg to 330 deg by energization in energization mode (1).

Here, terminal voltage Vw of the W phase decreases to the negative side with energization stop, and then increases and converges to about the reference voltage. The motor angle changes from 240 deg to 330 deg during this time, and also the timing of the minimum value exceeds the angle of 270 deg. Accordingly, gain K is adjusted beforehand by experiment and simulation so that terminal voltage Vw of the W phase at about the angle of 270 deg can be estimated with reference to the minimum voltage.

In other words, the terminal voltage of the non-energized phase at 270 deg, which is the angle of switching from energization mode (1) to energization mode (2), can be determined by specifying beforehand the angle at which the terminal voltage of the non-energized phase is a minimum value. This terminal voltage of the non-energized phase at 270 deg is learned as threshold V1-2 used to determine switching from energization mode (1) to energization mode (2).

Threshold V1-2 calculated in step 55 this time is stored over a previously stored value of threshold V1-2, thereby updating threshold V1-2. When driving brushless motor 2, the timing of switching from energization mode (1) to energization mode (2) is determined based on this updated threshold V1-2.

In the determination of the timing of switching from energization mode (1) to energization mode (2), the motor angle is estimated at about 270 deg when, during energization in energization mode (1), terminal voltage Vw of the W phase becomes lower than threshold V1-2. At this point, the energization mode is switched from (1) to (2).

The following describes learning of a threshold V2-3 used to determine switching from energization mode (2) to energization mode (3) in step 6, in detail.

First, in step 61, permanent-magnet rotor 216 is positioned at an initial position having a set angle of 300 deg.

In detail, applied voltages Vu, Vv, and Vw of the U, V, and W phases are set to Vu=Vin×½, Vv=−Vin, and Vw=Vin×½, based on predetermined voltage Vin.

Figure 17A:
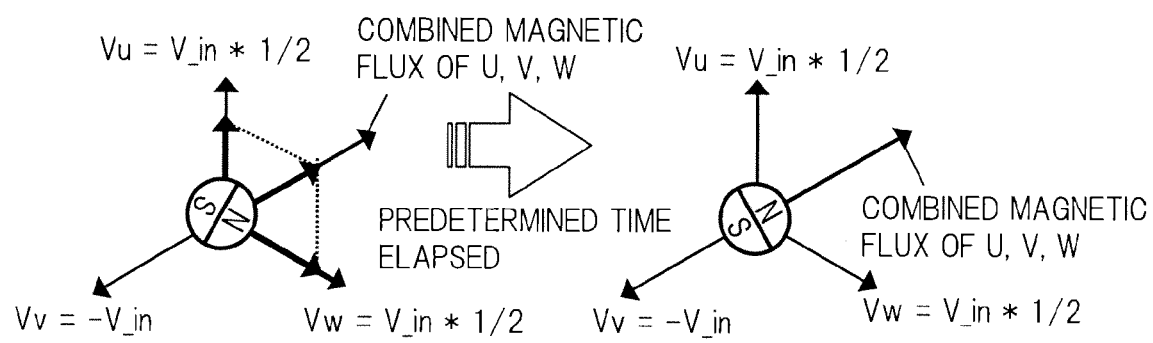
FIG. 17 is a diagram illustrating a state of learning a threshold V2-3 in the embodiment of the present invention.

When the applied voltages of the U, V, and W phases are set in this way, a combined magnetic flux of the U, V, and W phases is generated as illustrated in FIG. 17A. Permanent-magnet rotor 216 is attracted to such a combined magnetic flux. This generates a torque, as a result of which the north pole of permanent-magnet rotor 216 rotates to the set angle of 300 deg.

In step 62, when a delay time expected to be needed for the north pole of permanent-magnet rotor 216 to reach the set angle elapses after setting applied voltages Vu, Vv, and Vw of the U, V, and W phases in step 61 and so it can be estimated that permanent-magnet rotor 216 stops at the initial position, applied voltages Vu, Vv, and Vw are switched to the applied voltages corresponding to energization mode (2), that is, Vu=Vin, Vv=0, and Vw=−Vin.

Figure 17B:
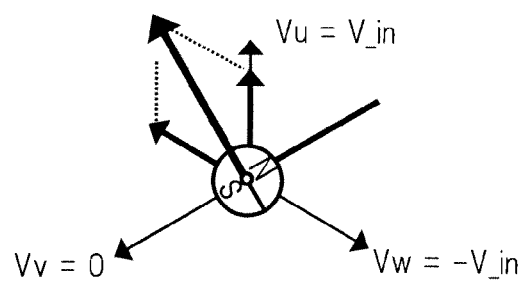

As a result of switching to the applied voltages corresponding to energization mode (2), the combined magnetic flux of the U, V, and W phases changes as illustrated in FIG. 17B. Permanent-magnet rotor 216 is attracted to such a combined magnetic flux. This generates a torque, as a result of which the north pole of permanent-magnet rotor 216 rotates from the initial position to an angle of 30 deg corresponding to energization mode (2).

Figure 18A:
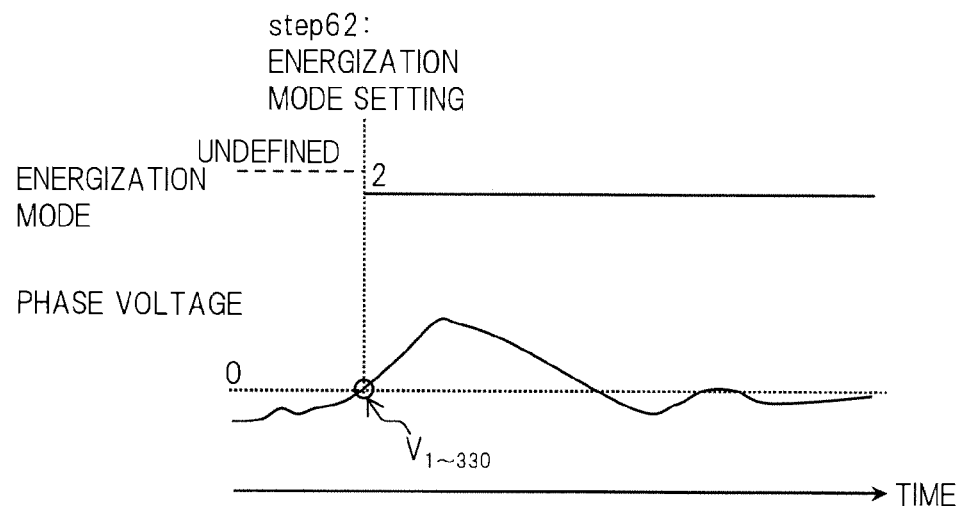
FIG. 18 is a time chart illustrating a voltage change of a non-energized phase when learning threshold V2-3 in the embodiment of the present invention.

In step 63, terminal voltage Vv of the V phase, which is the non-energized phase in energization mode (2), immediately after switching from the applied voltages for setting at the initial position to the applied voltages corresponding to energization mode (2) is stored as a voltage V1-330, as illustrated in FIG. 18A.

Figure 18B:
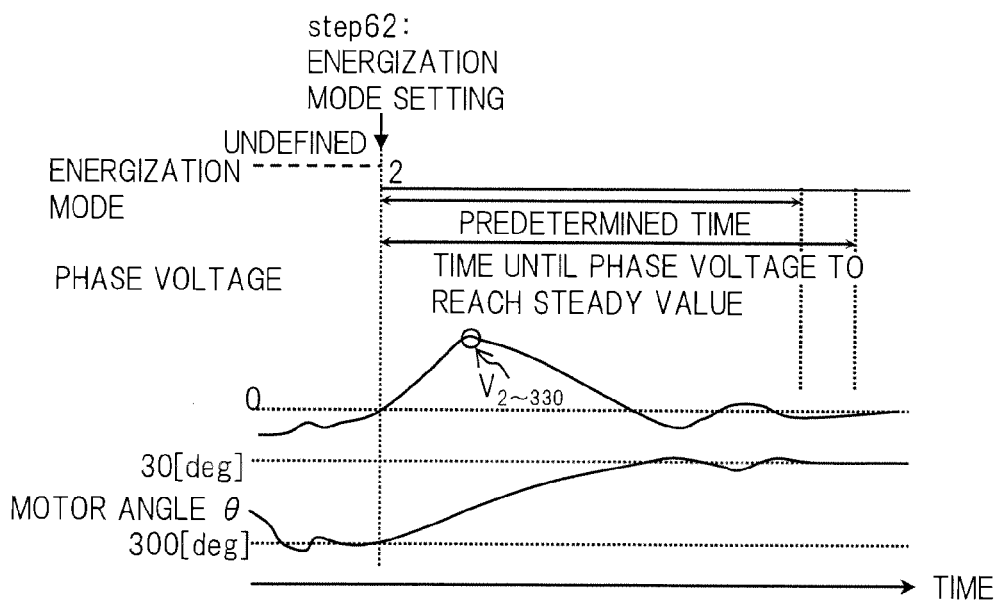

In step 64, a maximum value of terminal voltage Vv of the V phase in a period until a set time elapses after the applied voltages are switched to the applied voltages corresponding to energization mode (2) is detected and stored as a voltage V2-330, as illustrated in FIG. 18B.

Terminal voltage Vv of the V phase increases as a result of switching to the applied voltages corresponding to energization mode (2), and then decreases and converges to the steady voltage. Based on such characteristics, the set time is adjusted beforehand as a sufficient time for detecting the maximum voltage.

Note that, instead of specifying the maximum voltage detection period by time, a point at which the convergence of terminal voltage Vv of the V phase to the steady state is detected may be used as an end of the maximum voltage detection period.

In step 65, threshold V2-3 used to determine switching from energization mode (2) to energization mode (3) is calculated according to the following equation (11) or (12).

$$(\text{threshold } V\text{2-3}) = K \times ((\text{voltage } V\text{2-330}) - (\text{voltage } V\text{1-330})) \quad \text{Equation (11):}$$

$$(\text{threshold } V\text{2-3}) = K \times ((\text{voltage } V\text{2-330}) - (\text{reference voltage})) \quad \text{Equation (12):}$$

In equations (11) and (12), K is a gain, where K=½ as an example. The reference voltage in equation (12) is 0 V or (power voltage)/2, as an example.

The angle of switching from energization mode (2) to energization mode (3) is 330 deg. In an energization state of energization mode (2), terminal voltage Vv of the V phase at the angle of 330 deg is estimated based on a change in terminal voltage Vv when brushless motor 2 rotates from 300 deg to 30 deg by energization in energization mode (2).

Here, terminal voltage Vv of the V phase increases to the positive side with energization stop, and then decreases and converges to about the reference voltage. The motor angle changes from 300 deg to 30 deg during this time, and also the timing of the maximum value exceeds the angle of 330 deg. Accordingly, gain K is adjusted beforehand by experiment and simulation so that terminal voltage Vv of the V phase at about the angle of 330 deg can be estimated with reference to the maximum voltage.

In other words, the terminal voltage of the non-energized phase at 330 deg, which is the angle of switching from energization mode (2) to energization mode (3), can be determined by specifying beforehand the angle at which the terminal voltage of the non-energized phase is a maximum value. This terminal voltage of the non-energized phase at 330 deg is learned as threshold V2-3 used to determine switching from energization mode (2) to energization mode (3).

Threshold V2-3 calculated in step 65 this time is stored over a previously stored value of threshold V2-3, thereby updating threshold V2-3. When driving brushless motor 2, the timing of switching from energization mode (2) to energization mode (3) is determined based on this updated threshold V2-3.

In the determination of the timing of switching from energization mode (2) to energization mode (3), the motor angle is estimated at about 330 deg when, during energization in energization mode (2), terminal voltage Vv of the V phase becomes higher than threshold V2-3. At this point, the energization mode is switched from (2) to (3).

As described above, the angular position preceding the switching angle of the energization mode corresponding to the threshold to be learned is set as the initial position, and the voltage is applied to each phase so that permanent-magnet rotor 216 stops at the initial position. After this, switching to the energization mode is performed so that brushless motor 2 rotates through the switching angle of the energization mode.

Then, the terminal voltage of the non-energized phase at the switching angle of the energization mode is calculated and learned as the threshold used to determine energization mode switching. This enables the threshold to be corrected to an appropriate value in relation to various factors of variations such as motor variations and temperature environments. Hence, a deviation in energization mode switching timing from a desired angular position can be suppressed.

Moreover, the threshold is individually learned for each of the six energization modes, and the threshold is selected according to which energization mode is subjected to switching. Therefore, even when the individual windings of brushless motor 2 have variations, switching to each energization mode can be performed at an appropriate timing.

In the threshold learning illustrated in the flowcharts of FIGS. 5 and 6, the positioning to the initial position is performed as the first process in each of steps 1 to 6. However, instead of setting the set angle (0 deg, 60 deg, 120 deg, 180 deg, 240 deg, 300 deg) as the initial position, energization may be performed in a pattern corresponding to any of energization modes (1) to (6), with a rotation position in this energization mode being set as the initial position.

Figure 19:
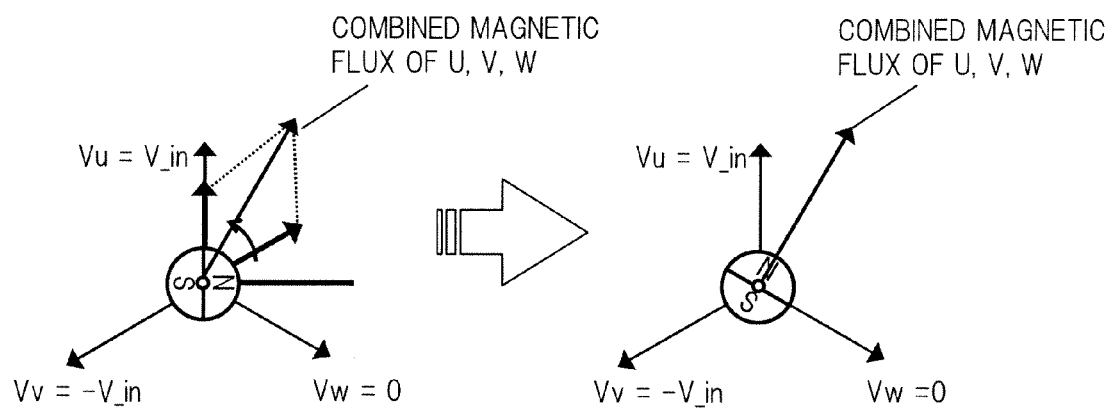
FIG. 19 is a diagram illustrating learning of threshold V3-4 with an angular position in an energization mode (1) being set as an initial position, in the embodiment of the present invention.

FIG. 19 is a diagram illustrating the case in which, in step 1 of learning threshold V3-4 used to determine the timing of switching from energization mode (3) to energization mode (4), the initial position setting in step 11 is performed by phase energization in an energization mode.

Here, instead of phase energization with the set angle of 0 deg, applied voltages Vu, Vv, and Vw of the U, V, and W phases are set to phase energization corresponding to energization mode (1), that is, Vu=Vin, Vv=−Vin, and Vw=0, thereby setting the motor angle initial value to 330 deg.

By switching, from this state of stopping at the initial angle of 330 deg, to phase energization in energization mode (3) (Vu=0, Vv=Vin, and Vw=−Vin), brushless motor 2 is rotated from 330 deg to 90 deg. Based on a minimum value of the terminal voltage of the U phase during this rotation, threshold V3-4 used to determine the timing of switching from energization mode (3) to energization mode (4), namely, the terminal voltage of the non-energized phase at the energization mode switching angle of 30 deg, is learned.

Figure 20:
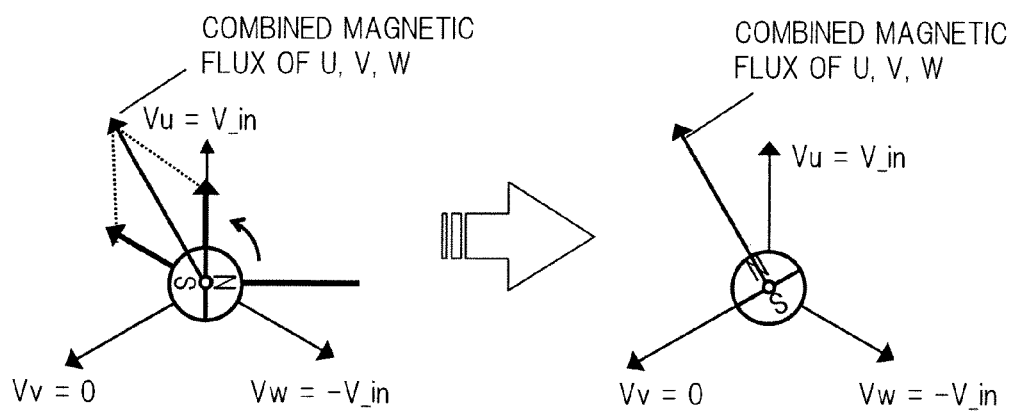
FIG. 20 is a diagram illustrating learning of threshold V4-5 with an angular position in an energization mode (2) being set as an initial position, in the embodiment of the present invention.

FIG. 20 is a diagram illustrating the case in which, in step 2 of learning threshold V4-5 used to determine the timing of switching from energization mode (4) to energization mode (5), the initial position setting in step 21 is performed by phase energization in an energization mode.

Here, instead of phase energization with the set angle of 60 deg, applied voltages Vu, Vv, and Vw of the U, V, and W phases are set to phase energization corresponding to energization mode (2), that is, Vu=Vin, Vv=0, and Vw=−Vin, thereby setting the motor angle initial value to 30 deg.

By switching, from this state of stopping at the initial angle of 30 deg, to phase energization in energization mode (4) (Vu=−Vin, Vv=Vin, and Vw=0), brushless motor 2 is rotated from 30 deg to 150 deg. Based on a maximum value of the terminal voltage of the W phase during this rotation, threshold V4-5 used to determine the timing of switching from energization mode (4) to energization mode (5), namely, the terminal voltage of the non-energized phase at the energization mode switching angle of 90 deg, is learned.

Figure 21:
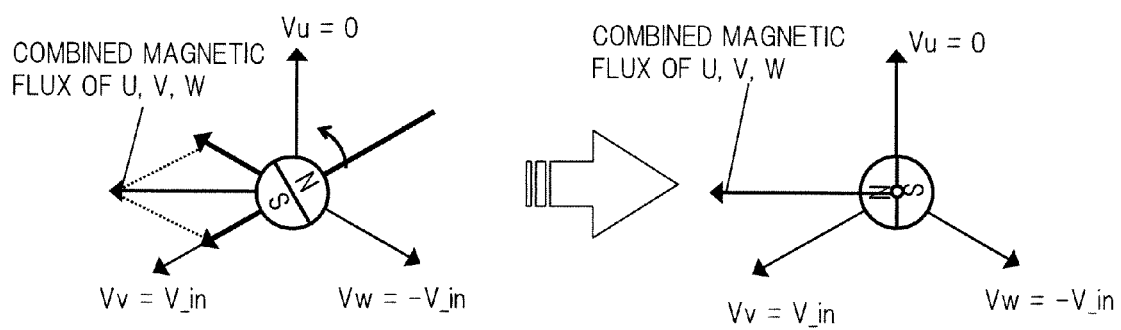
FIG. 21 is a diagram illustrating learning of threshold V5-6 with an angular position in an energization mode (3) being set as an initial position, in the embodiment of the present invention.

FIG. 21 is a diagram illustrating the case in which, in step 3 of learning threshold V5-6 used to determine the timing of switching from energization mode (5) to energization mode (6), the initial position setting in step 31 is performed by phase energization in an energization mode.

Here, instead of phase energization with the set angle of 120 deg, applied voltages Vu, Vv, and Vw of the U, V, and W phases are set to phase energization corresponding to energization mode (3), that is, Vu=0, Vv=Vin, and Vw=−Vin, thereby setting the motor angle initial value to 90 deg.

By switching, from this state of stopping at the initial angle of 90 deg, to phase energization in energization mode (5) (Vu=−Vin, Vv=0, and Vw=Vin), brushless motor 2 is rotated from 90 deg to 210 deg. Based on a minimum value of the terminal voltage of the V phase during this rotation, threshold V5-6 used to determine the timing of switching from energization mode (5) to energization mode (6), namely, the terminal voltage of the non-energized phase at the energization mode switching angle of 150 deg, is learned.

Figure 22:
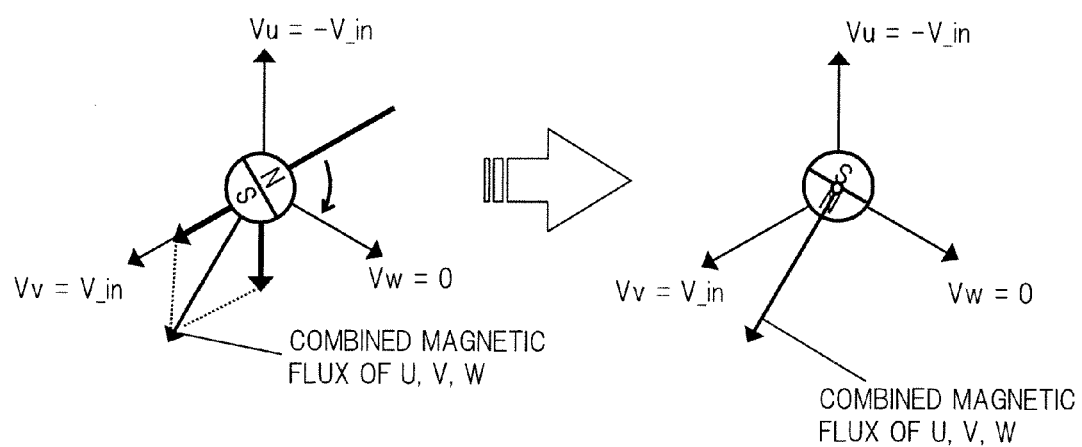
FIG. 22 is a diagram illustrating learning of threshold V6-1 with an angular position in an energization mode (4) being set as an initial position, in the embodiment of the present invention.

FIG. 22 is a diagram illustrating the case in which, in step 4 of learning threshold V6-1 used to determine the timing of switching from energization mode (6) to energization mode (1), the initial position setting in step 41 is performed by phase energization in an energization mode.

Here, instead of phase energization with the set angle of 180 deg, applied voltages Vu, Vv, and Vw of the U, V, and W phases are set to phase energization corresponding to energization mode (4), that is, Vu=−Vin, Vv=Vin, and Vw=0, thereby setting the motor angle initial value to 150 deg.

By switching, from this state of stopping at the initial angle of 150 deg, to phase energization in energization mode (6) (Vu=0, Vv=−Vin, and Vw=Vin), brushless motor 2 is rotated from 150 deg to 270 deg. Based on a maximum value of the terminal voltage of the U phase during this rotation, threshold V6-1 used to determine the timing of switching from energization mode (6) to energization mode (1), namely, the terminal voltage of the non-energized phase at the energization mode switching angle of 210 deg, is learned.

Figure 23:
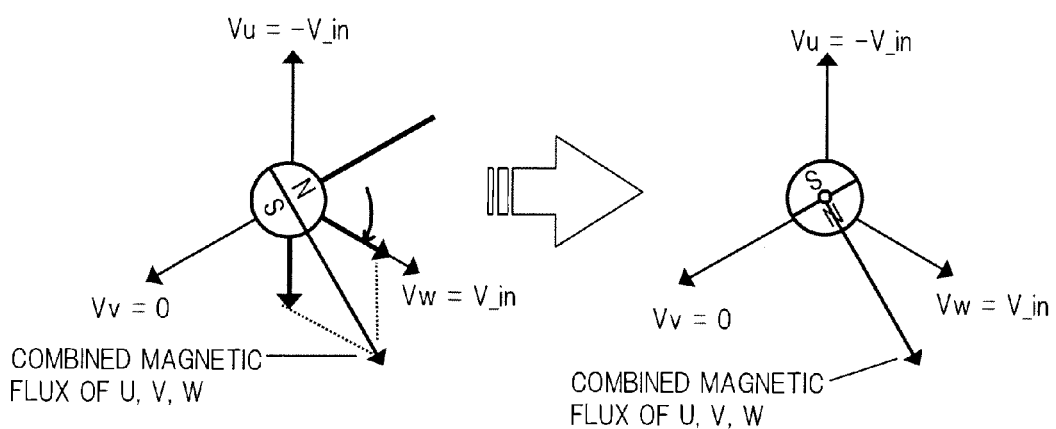
FIG. 23 is a diagram illustrating learning of threshold V1-2 with an angular position in an energization mode (5) being set as an initial position, in the embodiment of the present invention.

FIG. 23 is a diagram illustrating the case in which, in step 5 of learning threshold V1-2 used to determine the timing of switching from energization mode (1) to energization mode (2), the initial position setting in step 51 is performed by phase energization in an energization mode.

Here, instead of phase energization with the set angle of 240 deg, applied voltages Vu, Vv, and Vw of the U, V, and W phases are set to phase energization corresponding to energization mode (5), that is, Vu=−Vin, Vv=0, and Vw=Vin, thereby setting the motor angle initial value to 210 deg.

By switching, from this state of stopping at the initial angle of 210 deg, to phase energization in energization mode (1) (Vu=Vin, Vv=−Vin, and Vw=0), brushless motor 2 is rotated from 210 deg to 330 deg. Based on a minimum value of the terminal voltage of the W phase during this rotation, threshold V1-2 used to determine the timing of switching from energization mode (1) to energization mode (2), namely, the terminal voltage of the non-energized phase at the energization mode switching angle of 270 deg, is learned.

Figure 24:
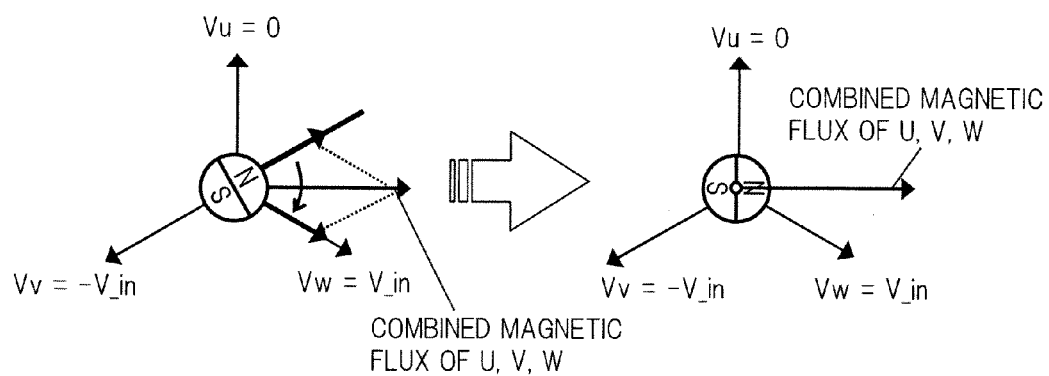
FIG. 24 is a diagram illustrating learning of threshold V2-3 with an angular position in an energization mode (6) being set as an initial position, in the embodiment of the present invention.

FIG. 24 is a diagram illustrating the case in which, in step 6 of learning threshold V2-3 used to determine the timing of switching from energization mode (2) to energization mode (3), the initial position setting in step 61 is performed by phase energization in an energization mode.

Here, instead of phase energization with the set angle of 300 deg, applied voltages Vu, Vv, and Vw of the U, V, and W phases are set to phase energization corresponding to energization mode (6), that is, Vu=0, Vv=−Vin, and Vw=Vin, thereby setting the motor angle initial value to 270 deg.

By switching, from this state of stopping at the initial angle of 270 deg, to phase energization in energization mode (2) (Vu=Vin, Vv=0, and Vw=−Vin), brushless motor 2 is rotated from 270 deg to 30 deg. Based on a maximum value of the terminal voltage of the V phase during this rotation, threshold V2-3 used to determine the timing of switching from energization mode (2) to energization mode (3), that is, the terminal voltage of the non-energized phase at the energization mode switching angle of 330 deg, is learned.

Moreover, the threshold setting method in each of steps 15, 25, 35, 45, 55, and 65 is not limited to the setting method indicated by equations (1) to (12). For example, the following method may be employed.

Here, assume that inertia of electric oil pump 1 is J, a torque constant is Kt, and a motor current is I, an angular speed ω of brushless motor 2 is calculated according to the following equation (13).

$$\omega = Kt/J \times \int I dt \qquad \text{Equation (13):}$$

An angular position θ after energization mode switching is calculated according to the following equation (14).

$$\theta = \int \omega dt \qquad \text{Equation (2):}$$

Therefore, in the case in which the position to which brushless motor 2 rotates from the initial position by 30 deg is the energization mode switching timing, the terminal voltage of the non-energized phase when detecting the angular position of the switching timing from equation (14) can be learned as the threshold used to determine energization mode switching.

When switching to the energization mode subject to threshold learning from the initial position, the terminal voltage of the non-energized phase increases or decreases from the reference voltage and then crosses the reference voltage. The point at which the terminal voltage of the non-energized phase returns to about the reference voltage can be estimated as the point at which brushless motor 2 is at the angular position corresponding to the energization mode. Hence, a time Tre that is needed for the terminal voltage of the non-energized phase to return to the reference voltage after switching to the energization mode subject to learning can be regarded as a time needed for brushless motor 2 to rotate from the initial position to the angular position in the energization mode.

Here, suppose an angular change from the initial position to the angular position in the energization mode subject to learning is 90 deg. In this case, time Tre needed for the terminal voltage of the non-energized phase to return to the reference voltage is a time needed for brushless motor 2 to rotate by 90 deg. When the position to which brushless motor 2 rotates from the initial position by 30 deg is the energization mode switching angle, the position that is ⅓ of the total angular change of 90 deg corresponds to the energization mode switching angle.

This enables estimation that the energization mode switching angle is reached when a time Tre/3 elapses after setting the energization mode subject to learning.

Figure 25:
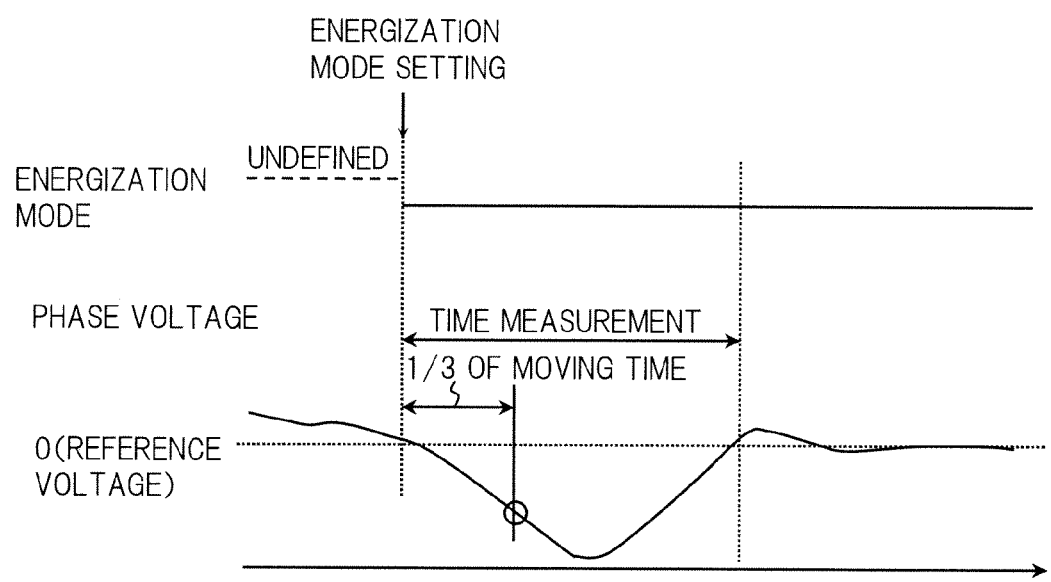
FIG. 25 is a time chart illustrating threshold learning based on a time Tre until a voltage of a non-energized phase to converge, in the embodiment of the present invention.

In view of this, as illustrated in FIG. 25, while measuring time Tre, the terminal voltage of the non-energized phase sampled until time Tre is reached is stored in chronological order. As a result, the terminal voltage stored corresponding to the elapse of time Tre/3 can be learned as the terminal voltage at the energization mode switching angle, i.e., as the threshold.

Moreover, a minimum value and a maximum value of the terminal voltage of the non-energized phase detected in threshold learning change according to motor temperature. Therefore, by specifying a correlation between the motor temperature and the minimum value and the maximum value beforehand, it is possible to estimate the motor temperature from the detected minimum value and maximum value based on the correlation.

The motor temperature estimation result can be used, in the case of learning the threshold for each temperature, to determine in which temperature range the learning is to be performed. The motor temperature estimation result can also be used to correct temperature-dependent parameters such as an induced voltage constant, a torque constant, and a resistance. Brushless motor 2 can then be efficiently controlled using such parameters.

Figure 26:
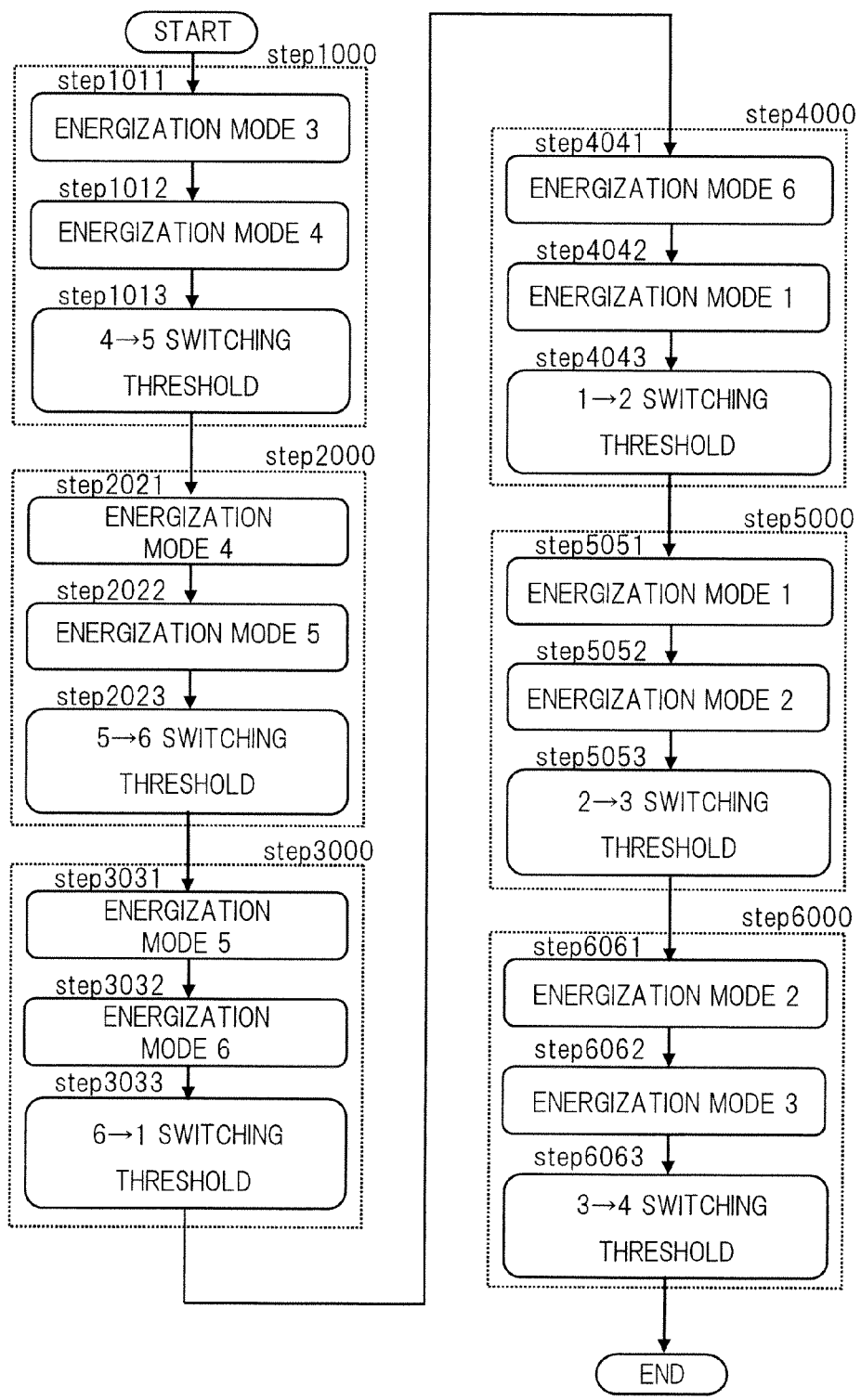
FIG. 26 is a flowchart illustrating threshold learning in the embodiment of the present invention.

A routine illustrated in a flowchart of FIG. 26 represents another example of threshold learning by controller 213.

In step 1000, threshold V4-5 used to determine switching from energization mode (4) to energization mode (5) is learned. In step 2000, threshold V5-6 used to determine switching from energization mode (5) to energization mode (6) is learned. In step 3000, threshold V6-1 used to determine switching from energization mode (6) to energization mode (1) is learned. In step 4000, threshold V1-2 used to determine switching from energization mode (1) to energization mode (2) is learned. In step 5000, threshold V2-3 used to determine switching from energization mode (2) to energization mode (3) is learned. In step 6000, threshold V3-4 used to determine switching from energization mode (3) to energization mode (4) is learned. Note that the voltage threshold learning order is arbitrary, and may be changed according to need.

In detail, steps 1011 to 1013 are executed in step 1000 of learning threshold V4-5 used to determine switching from energization mode (4) to energization mode (5).

First, in step 1011, permanent-magnet rotor 216 is positioned at an angle corresponding to energization mode (3).

Figure 27A:
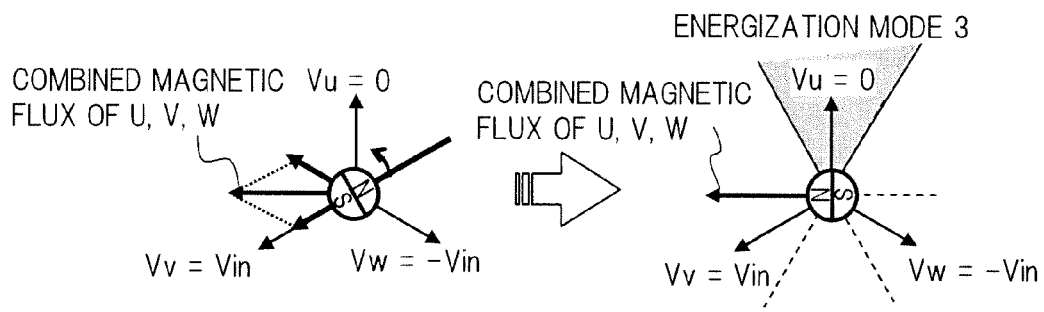
FIG. 27 is a diagram illustrating a state of learning threshold V4-5 in the embodiment of the present invention.

In detail, as illustrated in FIG. 27A, the applied voltages corresponding to energization mode (3), that is, Vu=0, Vv=Vin, and Vw=−Vin, are applied to the U, V, and W phases. When the applied voltages corresponding to energization mode (3) are applied to the U, V, and W phases, a combined magnetic flux of the U, V, and W phases is generated as illustrated in FIG. 27A. Permanent-magnet rotor 216 is attracted to such a combined magnetic flux. This generates a torque, as a result of which the north pole of permanent-magnet rotor 216 rotates to the angle of 90 deg.

Note that 90 deg which is the angle when the applied voltages corresponding to energization mode (3) are applied is the angular position of switching from energization mode (4) to energization mode (5), as mentioned above.

Figure 27B:
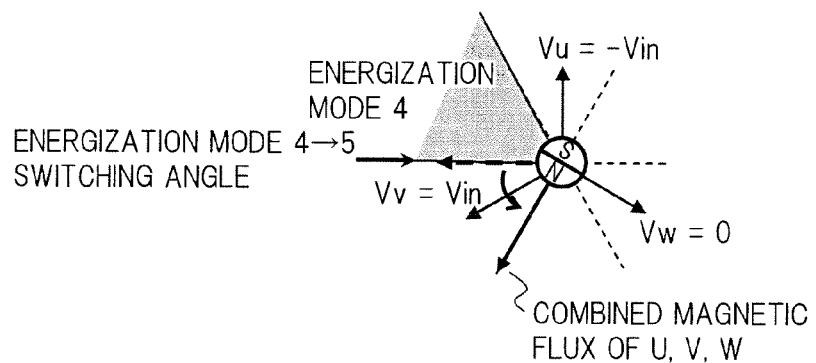

In step 1012, when a delay time expected to be needed for the north pole of permanent-magnet rotor 216 to reach the angular position of 90 deg corresponding to energization mode (3) elapses after setting applied voltages Vu, Vv, and Vw of the U, V, and W phases to the applied voltages corresponding to energization mode (3) in step 1011 and so it can be estimated that permanent-magnet rotor 216 stops at the angular position of 90 deg, applied voltages Vu, Vv, and Vw are switched from the applied voltages corresponding to energization mode (3) to the applied voltages corresponding to energization mode (4), that is, Vu=−Vin, Vv=Vin, and Vw=0, as illustrated in FIG. 27B.

In each of FIGS. 27A and 27B, the fan-shaped shaded area about permanent-magnet rotor 216 indicates an angle area in which energization in the corresponding energization mode is performed when rotatively driving brushless motor 2. The same applies to FIGS. 28A and 28B to 32A to 32B.

Figure 27C:
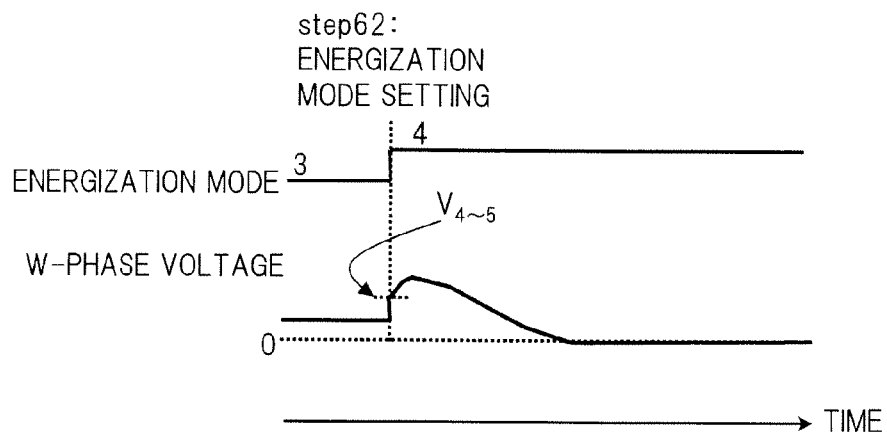

In step 1013, terminal voltage Vw of the W phase, which is the non-energized phase in energization mode (4), immediately after switching from the applied voltages corresponding to energization mode (3) to the applied voltages corresponding to energization mode (4) is detected, and threshold V4-5 used to determine switching from energization mode (4) to energization mode (5) is updated based on terminal voltage Vw and stored, as illustrated in FIG. 27C.

That is, switching from energization mode (4) to energization mode (5) is set to be performed at the angle of 90 deg, as mentioned earlier. Whether or not the angle of 90 deg is reached is determined based on terminal voltage Vw of the W phase which is the non-energized phase in energization mode (4).

Here, by maintaining the applied voltages corresponding to energization mode (3), permanent-magnet rotor 216 can be positioned at the angular position of switching from energization mode (4) to energization mode (5). When the energization mode is switched from (3) to (4) in such a state, terminal voltage Vw of the W phase immediately after the switching represents terminal voltage V of the non-energized phase at the angular position of 90 deg.

This being so, threshold V4-5 used to determine switching from energization mode (4) to energization mode (5) is updated based on terminal voltage Vw of the W phase immediately after switching to energization mode (4) from the state in which the applied voltages corresponding to energization mode (3) are maintained, and updated threshold V4-5 is stored. When terminal voltage Vw of the W phase which is the non-energized phase in energization mode (4) crosses threshold V4-5, switching from energization mode (4) to energization mode (5) is executed.

In the threshold update process, terminal voltage V of the non-energized phase obtained this time may directly be stored as the threshold. As an alternative, a weighted average of a previously stored value of the threshold and terminal voltage V of the non-energized phase obtained this time may be stored as a new value of the threshold. As another alternative, a moving average of terminal voltage V of the non-energized phase obtained a plurality of times in the past may be stored as a new value of the threshold.

In the case in which terminal voltage V of the non-energized phase obtained this time is within a normal range stored beforehand, the threshold is updated based on terminal voltage V of the non-energized phase obtained this time. In the case in which terminal voltage V of the non-energized phase obtained this time is not within the normal range, the previously stored value of the threshold is retained, without updating the threshold based on terminal voltage V of the non-energized phase obtained this time.

Moreover, a design value is stored as an initial value of the threshold beforehand, and the energization mode switching timing is determined using the initial value as the threshold when no threshold learning has been performed yet.

In the case of A/D converting and reading the terminal voltage of the non-energized phase at a regular time interval, the terminal voltage of the non-energized phase that is read first after energization mode switching may be detected as the terminal voltage of the non-energized phase immediately after energization mode switching. Alternatively, A/D conversion may be performed synchronously with energization mode switching.

The following describes learning of threshold V5-6 used to determine switching from energization mode (5) to energization mode (6) in step 2000, in detail.

First, in step 2021, permanent-magnet rotor 216 is positioned at an angle corresponding to energization mode (4).

Figure 28A:
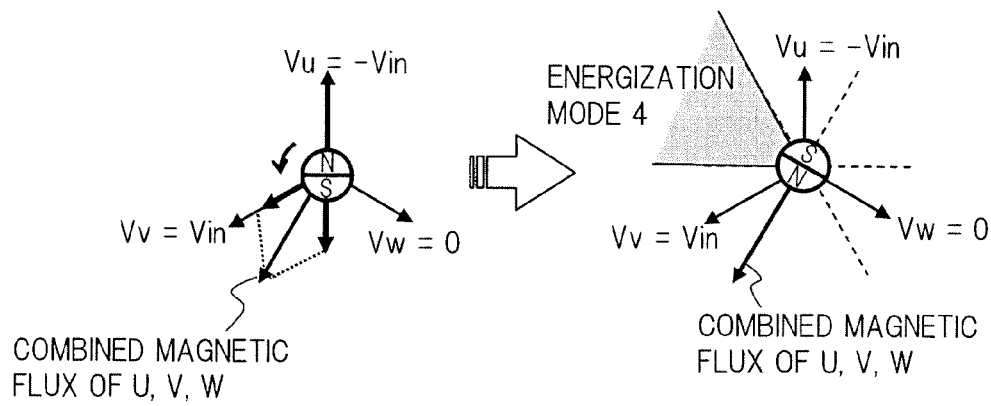
FIG. 28 is a diagram illustrating a state of learning threshold V5-6 in the embodiment of the present invention.

In detail, as illustrated in FIG. 28A, the applied voltages corresponding to energization mode (4), that is, Vu=−Vin, Vv=Vin, and Vw=0, are applied to the U, V, and W phases. When the applied voltages corresponding to energization mode (4) are applied to the U, V, and W phases, a combined magnetic flux of the U, V, and W phases is generated as illustrated in FIG. 28A. Permanent-magnet rotor 216 is attracted to such a combined magnetic flux. This generates a torque, as a result of which the north pole of permanent-magnet rotor 216 rotates to the angle of 150 deg.

Note that 150 deg which is the angle when the applied voltages corresponding to energization mode (4) are applied is the angular position of switching from energization mode (5) to energization mode (6), as mentioned above.

Figure 28B:
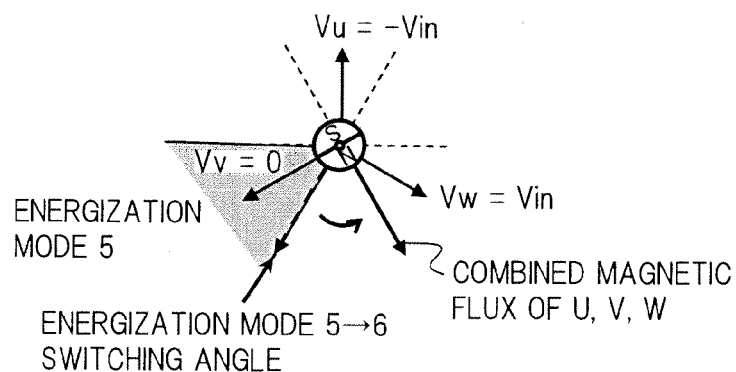

In step 2022, when a delay time expected to be needed for the north pole of permanent-magnet rotor 216 to reach the angular position of 150 deg corresponding to energization mode (4) elapses after setting applied voltages Vu, Vv, and Vw of the U, V, and W phases to the applied voltages corresponding to energization mode (4) in step 2021 and so it can be estimated that permanent-magnet rotor 216 stops at the angular position of 150 deg, applied voltages Vu, Vv, and Vw are switched from the applied voltages corresponding to energization mode (4) to the applied voltages corresponding to energization mode (5), that is, Vu=−Vin, Vv=0, and Vw=Vin, as illustrated in FIG. 28B.

Figure 28C:
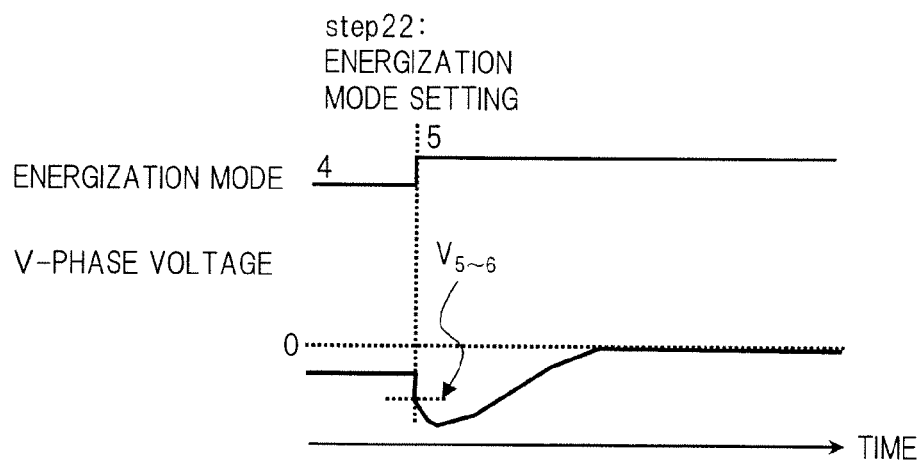

In step 2023, terminal voltage Vv of the V phase, which is the non-energized phase in energization mode (5), immediately after switching from the applied voltages corresponding to energization mode (4) to the applied voltages corresponding to energization mode (5) is detected, and threshold V5-6 used to determine switching from energization mode (5) to energization mode (6) is updated based on terminal voltage Vv and stored, as illustrated in FIG. 28C.

That is, switching from energization mode (5) to energization mode (6) is set to be performed at the angle of 150 deg, as mentioned earlier. Whether or not the angle of 150 deg is reached is determined based on terminal voltage Vv of the V phase which is the non-energized phase in energization mode (5).

Here, by maintaining the applied voltages corresponding to energization mode (4), permanent-magnet rotor 216 can be positioned at the angular position of switching from energization mode (5) to energization mode (6). When the energization mode is switched from (4) to (5) in such a state, terminal voltage Vv of the V phase immediately after the switching represents terminal voltage V of the non-energized phase at the angular position of 150 deg.

This being so, threshold V5-6 used to determine switching from energization mode (5) to energization mode (6) is updated based on terminal voltage Vv of the V phase immediately after switching to energization mode (5) from the state in which the applied voltages corresponding to energization mode (4) are maintained, and updated threshold V5-6 is stored. When terminal voltage Vv of the V phase which is the non-energized phase in energization mode (5) crosses threshold V5-6, switching from energization mode (5) to energization mode (6) is executed.

The following describes learning of threshold V6-1 used to determine switching from energization mode (6) to energization mode (1) in step 3000, in detail.

First, in step 3031, permanent-magnet rotor 216 is positioned at an angle corresponding to energization mode (5).

Figure 29A:
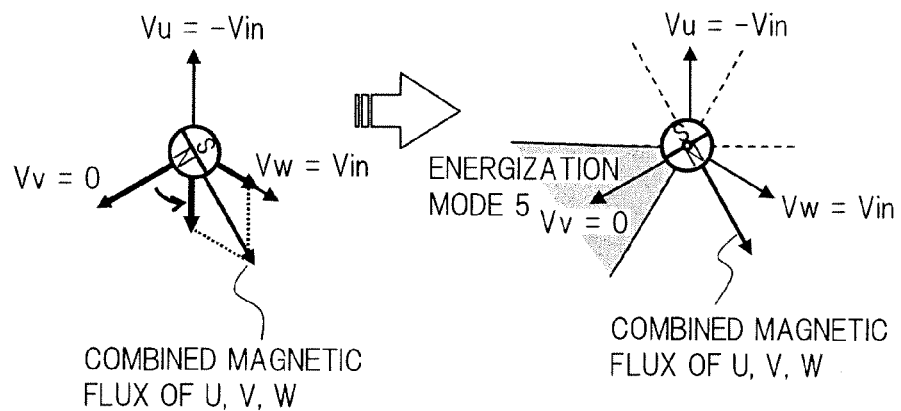
FIG. 29 is a diagram illustrating a state of learning threshold V6-1 in the embodiment of the present invention.

In detail, as illustrated in FIG. 29A, the applied voltages corresponding to energization mode (5), that is, Vu=−Vin, Vv=0, and Vw=Vin, are applied to the U, V, and W phases. When the applied voltages corresponding to energization mode (5) are applied to the U, V, and W phases, a combined magnetic flux of the U, V, and W phases is generated as illustrated in FIG. 29A. Permanent-magnet rotor 216 is attracted to such a combined magnetic flux. This generates a torque, as a result of which the north pole of permanent-magnet rotor 216 rotates to the angle of 210 deg.

Note that 210 deg which is the angle when the applied voltages corresponding to energization mode (5) are applied is the angular position of switching from energization mode (6) to energization mode (1), as mentioned above.

Figure 29B:
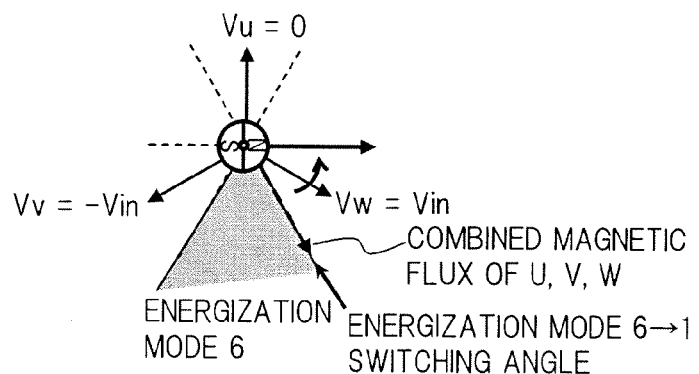

In step 3032, when a delay time expected to be needed for the north pole of permanent-magnet rotor 216 to reach the angular position of 210 deg corresponding to energization mode (5) elapses after setting applied voltages Vu, Vv, and Vw of the U, V, and W phases to the applied voltages corresponding to energization mode (5) in step 3031 and so it can be estimated that permanent-magnet rotor 216 stops at the angular position of 210 deg, applied voltages Vu, Vv, and Vw are switched from the applied voltages corresponding to energization mode (5) to the applied voltages corresponding to energization mode (6), that is, Vu=0, Vv=−Vin, and Vw=Vin, as illustrated in FIG. 29B.

Figure 29C:
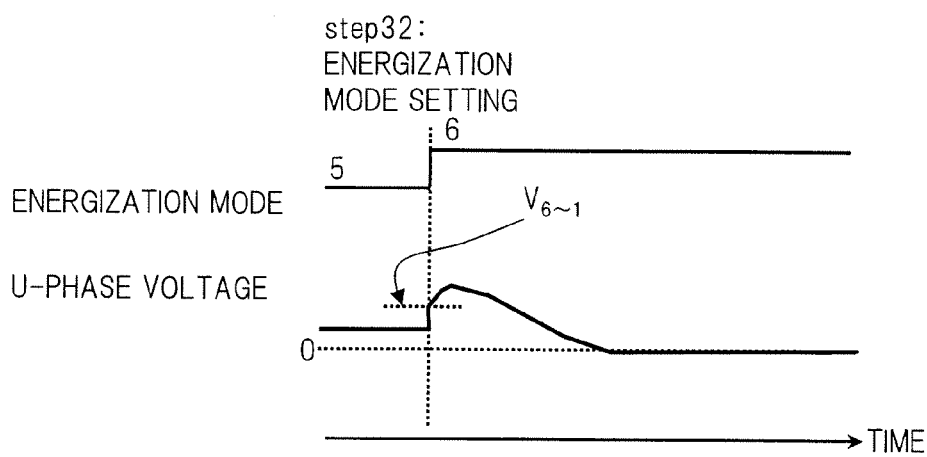

In step 3033, terminal voltage Vu of the U phase, which is the non-energized phase in energization mode (6), immediately after switching from the applied voltages corresponding to energization mode (5) to the applied voltages corresponding to energization mode (6) is detected, and threshold V6-1 used to determine switching from energization mode (6) to energization mode (1) is updated based on terminal voltage Vu and stored, as illustrated in FIG. 29C.

That is, switching from energization mode (6) to energization mode (1) is set to be performed at the angle of 210 deg, as mentioned earlier. Whether or not the angle of 210 deg is reached is determined based on terminal voltage Vu of the U phase which is the non-energized phase in energization mode (6).

Here, by maintaining the applied voltages corresponding to energization mode (5), permanent-magnet rotor 216 can be positioned at the angular position of switching from energization mode (6) to energization mode (1). When the energization mode is switched from (5) to (6) in such a state, terminal voltage Vu of the U phase immediately after the switching represents terminal voltage V of the non-energized phase at the angular position of 210 deg.

This being so, threshold V6-1 used to determine switching from energization mode (6) to energization mode (1) is updated based on terminal voltage Vu of the U phase immediately after switching to energization mode (6) from the state in which the applied voltages corresponding to energization mode (5) are maintained, and updated threshold V6-1 is stored. When terminal voltage Vu of the U phase which is the non-energized phase in energization mode (6) crosses threshold V6-1, switching from energization mode (6) to energization mode (1) is executed.

The following describes learning of threshold V1-2 used to determine switching from energization mode (1) to energization mode (2) in step 4000, in detail.

First, in step 4041, permanent-magnet rotor 216 is positioned at an angle corresponding to energization mode (6).

Figure 30A:
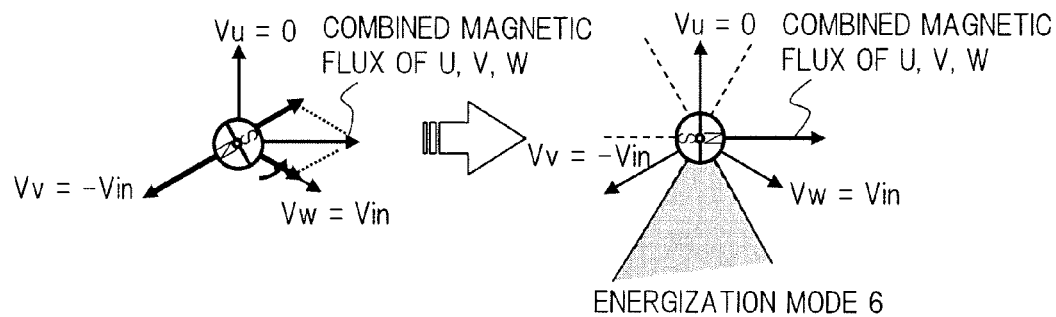
FIG. 30 is a diagram illustrating a state of learning threshold V1-2 in the embodiment of the present invention.

In detail, as illustrated in FIG. 30A, the applied voltages corresponding to energization mode (6), that is, Vu=0, Vv=−Vin, and Vw=Vin, are applied to the U, V, and W phases. When the applied voltages corresponding to energization mode (6) are applied to the U, V, and W phases, a combined magnetic flux of the U, V, and W phases is generated as illustrated in FIG. 30A. Permanent-magnet rotor 216 is attracted to such a combined magnetic flux. This generates a torque, as a result of which the north pole of permanent-magnet rotor 216 rotates to the angle of 270 deg.

Note that 270 deg which is the angle when the applied voltages corresponding to energization mode (6) are applied is the angular position of switching from energization mode (1) to energization mode (2), as mentioned above.

Figure 30B:
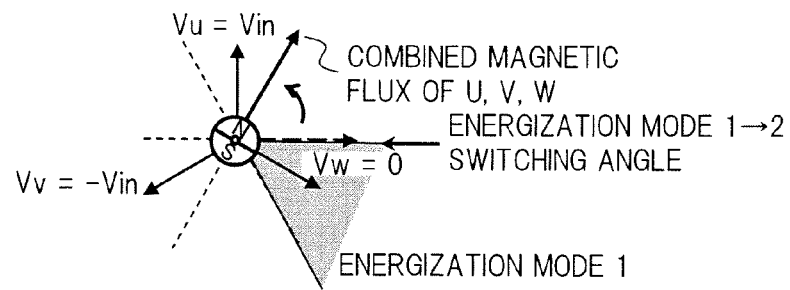

In step 4042, when a delay time expected to be needed for the north pole of permanent-magnet rotor 216 to reach the angular position of 270 deg corresponding to energization mode (6) elapses after setting applied voltages Vu, Vv, and Vw of the U, V, and W phases to the applied voltages corresponding to energization mode (6) in step 4041 and so it can be estimated that permanent-magnet rotor 216 stops at the angular position of 270 deg, applied voltages Vu, Vv, and Vw are switched from the applied voltages corresponding to energization mode (6) to the applied voltages corresponding to energization mode (1), that is, Vu=Vin, Vv=−Vin, and Vw=0, as illustrated in FIG. 30B.

Figure 30C:
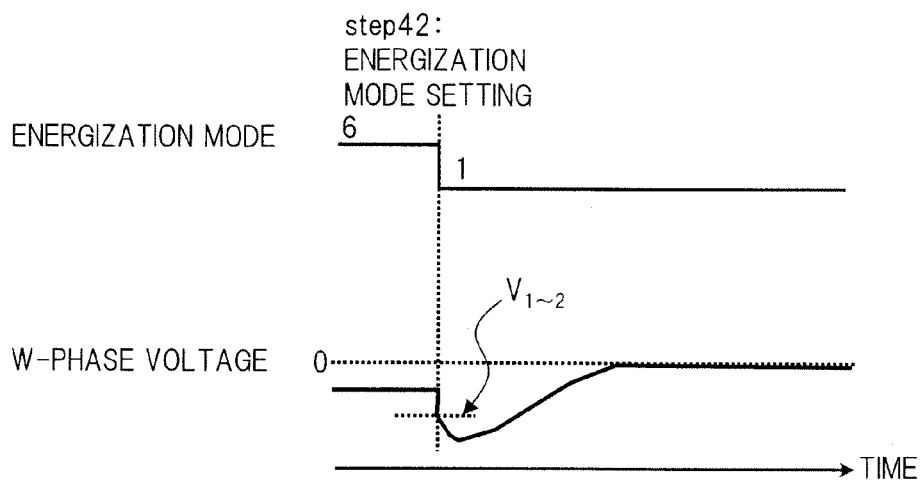

In step 4043, terminal voltage Vw of the W phase, which is the non-energized phase in energization mode (1), immediately after switching from the applied voltages corresponding to energization mode (6) to the applied voltages corresponding to energization mode (1) is detected, and threshold V1-2 used to determine switching from energization mode (1) to energization mode (2) is updated based on terminal voltage Vw and stored, as illustrated in FIG. 30C.

That is, switching from energization mode (1) to energization mode (2) is set to be performed at the angle of 270 deg, as mentioned earlier. Whether or not the angle of 270 deg is reached is determined based on terminal voltage Vw of the W phase which is the non-energized phase in energization mode (1).

Here, by maintaining the applied voltages corresponding to energization mode (6), permanent-magnet rotor 216 can be positioned at the angular position of switching from energization mode (1) to energization mode (2). When the energization mode is switched from (6) to (1) in such a state, terminal voltage Vw of the W phase immediately after the switching represents terminal voltage V of the non-energized phase at the angular position of 270 deg.

This being so, threshold V1-2 used to determine switching from energization mode (1) to energization mode (2) is updated based on terminal voltage Vw of the W phase immediately after switching to energization mode (1) from the state in which the applied voltages corresponding to energization mode (6) are maintained, and updated threshold V1-2 is stored. When terminal voltage Vw of the W phase which is the non-energized phase in energization mode (1) crosses threshold V1-2, switching from energization mode (1) to energization mode (2) is executed.

The following describes learning of threshold V2-3 used to determine switching from energization mode (2) to energization mode (3) in step 5000, in detail.

First, in step 5051, permanent-magnet rotor 216 is positioned at an angle corresponding to energization mode (1).

Figure 31A:
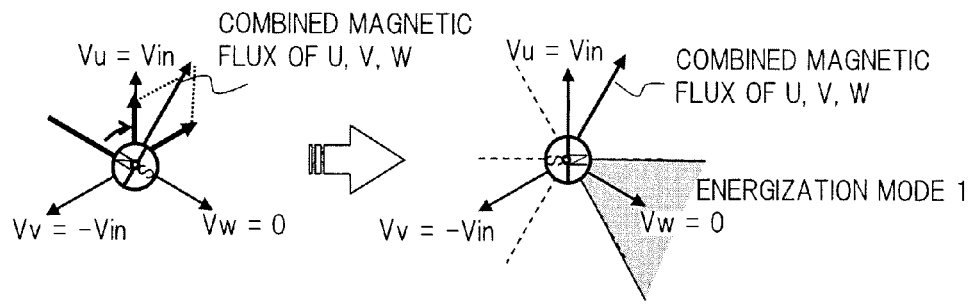
FIG. 31 is a diagram illustrating a state of learning threshold V2-3 in the embodiment of the present invention.

In detail, as illustrated in FIG. 31A, the applied voltages corresponding to energization mode (1), that is, Vu=Vin, Vv=−Vin, and Vw=0, are applied to the U, V, and W phases. When the applied voltages corresponding to energization mode (1) are applied to the U, V, and W phases, a combined magnetic flux of the U, V, and W phases is generated as illustrated in FIG. 31A. Permanent-magnet rotor 216 is attracted to such a combined magnetic flux. This generates a torque, as a result of which the north pole of permanent-magnet rotor 216 rotates to the angle of 330 deg.

Note that 330 deg which is the angle when the applied voltages corresponding to energization mode (1) are applied is the angular position of switching from energization mode (2) to energization mode (3), as mentioned above.

Figure 31B:
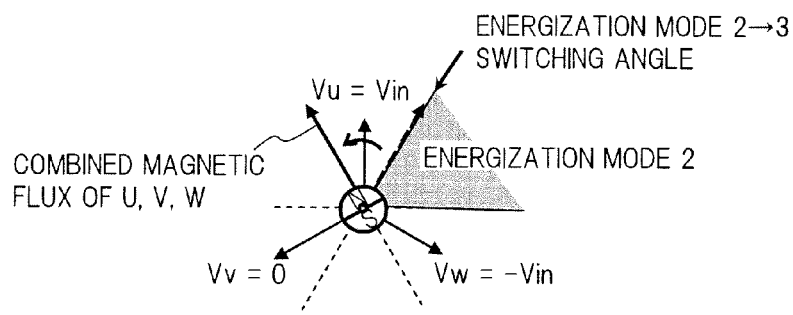

In step 5052, when a delay time expected to be needed for the north pole of permanent-magnet rotor 216 to reach the angular position of 330 deg corresponding to energization mode (1) elapses after setting applied voltages Vu, Vv, and Vw of the U, V, and W phases to the applied voltages corresponding to energization mode (1) in step 5051 and so it can be estimated that permanent-magnet rotor 216 stops at the angular position of 330 deg, applied voltages Vu, Vv, and Vw are switched from the applied voltages corresponding to energization mode (1) to the applied voltages corresponding to energization mode (2), that is, Vu=Vin, Vv=0, and Vw=−Vin, as illustrated in FIG. 31B.

Figure 31C:
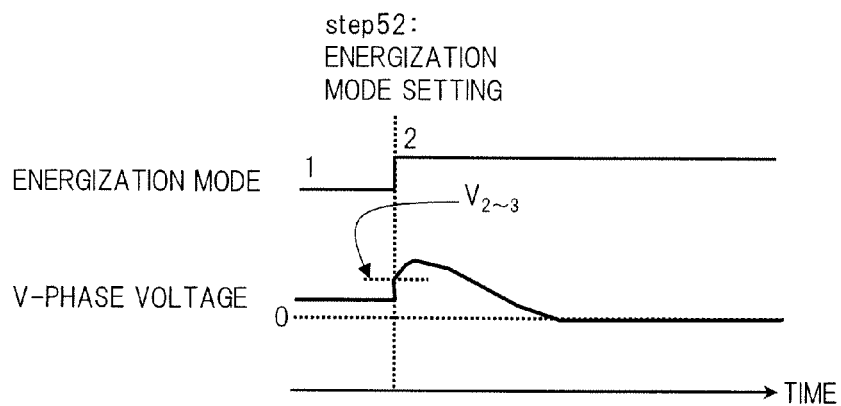

In step 5053, terminal voltage Vv of the V phase, which is the non-energized phase in energization mode (2), immediately after switching from the applied voltages corresponding to energization mode (1) to the applied voltages corresponding to energization mode (2) is detected, and threshold V2-3 used to determine switching from energization mode (2) to energization mode (3) is updated based on terminal voltage Vv and stored, as illustrated in FIG. 31C.

That is, switching from energization mode (2) to energization mode (3) is set to be performed at the angle of 330 deg, as mentioned earlier. Whether or not the angle of 330 deg is reached is determined based on terminal voltage Vv of the V phase which is the non-energized phase in energization mode (2).

Here, by maintaining the applied voltages corresponding to energization mode (1), permanent-magnet rotor 216 can be positioned at the angular position of switching from energization mode (2) to energization mode (3). When the energization mode is switched from (1) to (2) in such a state, terminal voltage Vv of the V phase immediately after the switching represents terminal voltage V of the non-energized phase at the angular position of 330 deg.

This being so, threshold V2-3 used to determine switching from energization mode (2) to energization mode (3) is updated based on terminal voltage Vv of the V phase immediately after switching to energization mode (2) from the state in which the applied voltages corresponding to energization mode (1) are maintained, and updated threshold V2-3 is stored. When terminal voltage Vv of the V phase which is the non-energized phase in energization mode (2) crosses threshold V2-3, switching from energization mode (2) to energization mode (3) is executed.

The following describes learning of threshold V3-4 used to determine switching from energization mode (3) to energization mode (4) in step 6000, in detail.

First, in step 6061, permanent-magnet rotor 216 is positioned at an angle corresponding to energization mode (2).

Figure 32A:
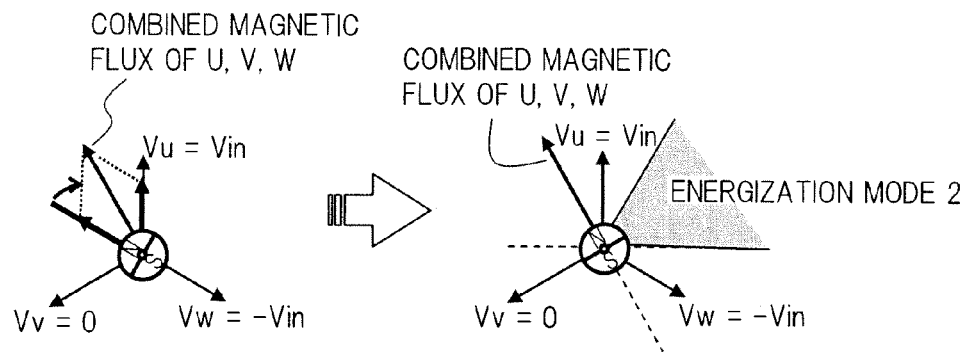
FIG. 32 is a diagram illustrating a state of learning threshold V3-4 in the embodiment of the present invention.

In detail, as illustrated in FIG. 32A, the applied voltages corresponding to energization mode (2), that is, Vu=Vin, Vv=0, and Vw=−Vin, are applied to the U, V, and W phases. When the applied voltages corresponding to energization mode (2) are applied to the U, V, and W phases, a combined magnetic flux of the U, V, and W phases is generated as illustrated in FIG. 32A. Permanent-magnet rotor 216 is attracted to such a combined magnetic flux. This generates a torque, as a result of which the north pole of permanent-magnet rotor 216 rotates to the angle of 30 deg.

Note that 30 deg which is the angle when the applied voltages corresponding to energization mode (2) are applied is the angular position of switching from energization mode (3) to energization mode (4), as mentioned above.

Figure 32B:
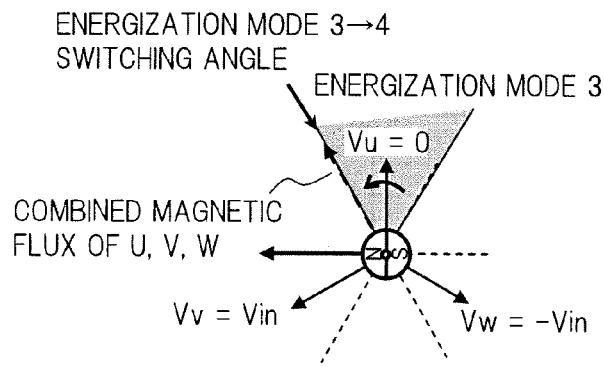

In step 6062, when a delay time expected to be needed for the north pole of permanent-magnet rotor 216 to reach the angular position of 30 deg corresponding to energization mode (2) elapses after setting applied voltages Vu, Vv, and Vw of the U, V, and W phases to the applied voltages corresponding to energization mode (2) in step 6061 and so it can be estimated that permanent-magnet rotor 216 stops at the angular position of 30 deg, applied voltages Vu, Vv, and Vw are switched from the applied voltages corresponding to energization mode (2) to the applied voltages corresponding to energization mode (3), that is, Vu=0, Vv=Vin, and Vw=−Vin, as illustrated in FIG. 32B.

Figure 32C:
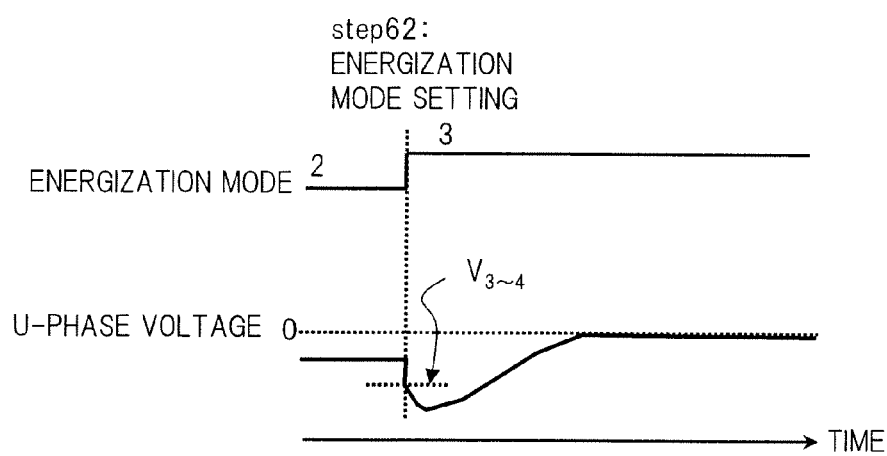

In step 6063, terminal voltage Vu of the U phase, which is the non-energized phase in energization mode (3), immediately after switching from the applied voltages corresponding to energization mode (2) to the applied voltages corresponding to energization mode (3) is detected, and threshold V3-4 used to determine switching from energization mode (3) to energization mode (4) is updated based on terminal voltage Vu and stored, as illustrated in FIG. 32C.

That is, switching from energization mode (3) to energization mode (4) is set to be performed at the angle of 30 deg, as mentioned earlier. Whether or not the angle of 30 deg is reached is determined based on terminal voltage Vu of the U phase which is the non-energized phase in energization mode (3).

Here, by maintaining the applied voltages corresponding to energization mode (2), permanent-magnet rotor 216 can be positioned at the angular position of switching from energization mode (3) to energization mode (4). When the energization mode is switched from (2) to (3) in such a state, terminal voltage Vu of the U phase immediately after the switching represents terminal voltage V of the non-energized phase at the angular position of 30 deg.

This being so, threshold V3-4 used to determine switching from energization mode (3) to energization mode (4) is updated based on terminal voltage Vu of the U phase immediately after switching to energization mode (3) from the state in which the applied voltages corresponding to energization mode (2) are maintained, and updated threshold V3-4 is stored. When terminal voltage Vu of the U phase which is the non-energized phase in energization mode (3) crosses threshold V3-4, switching from energization mode (3) to energization mode (4) is executed.

As described above, in the embodiment illustrated in the flowchart of FIG. 26, by maintaining one of energization modes (1) to (6), permanent-magnet rotor 216 is positioned at the angular position of energization mode switching. The energization mode is then switched from the energization mode at the time of positioning to the next energization mode, and the terminal voltage of the non-energized phase immediately after the switching is learned as the threshold used to switch the energization mode at the angular position at which permanent-magnet rotor 216 is positioned.

Accordingly, even when the terminal voltage of the non-energized phase at the angular position of energization mode switching varies due to factors such as detection variations of a voltage detection circuit, motor variations, and changes in environmental condition such as temperature, the threshold can be appropriately corrected in relation to these variations. Hence, a deviation in energization mode switching timing from a desired angular position can be suppressed.

Moreover, the threshold is individually learned for each of the six energization mode switching patterns, and the threshold used to determine the energization mode switching timing is selected according to which energization mode the energization mode is switched to. Therefore, even when the individual windings of brushless motor 2 have variations, switching to each energization mode can be performed at an appropriate timing.

Figure 33:
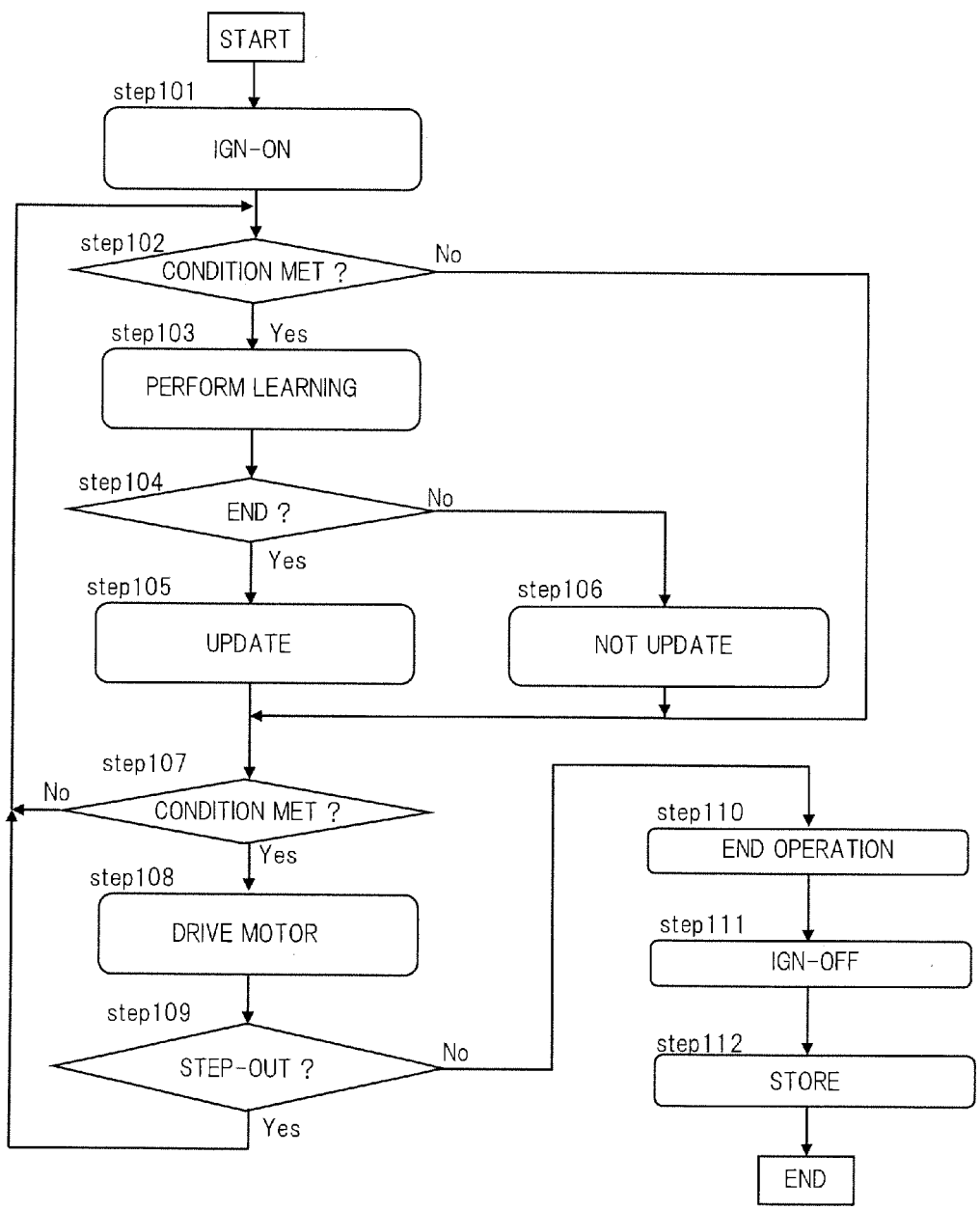
FIG. 33 is a flowchart illustrating learning of thresholds used for controlling the brushless motor that drives an electric oil pump in the embodiment of the present invention.

The following describes a flow of a learning process in the case in which the threshold used to determine energization mode switching is learned for brushless motor 2 that drives electric oil pump 1, with reference to a routine illustrated in a flowchart of FIG. 33.

In step 101, an ignition switch which is a main switch of the engine is turned on. In step 102, whether or not a threshold learning condition is met is determined.

In detail, the threshold learning condition is determined to be met when the following conditions (a) to (f) are all met:
 (a) The engine is rotating;
 (b) The oil temperature is within a learnable range;
 (c) There is no fault diagnosis for brushless motor 2, motor drive circuit 212, controller 213, and the like;
 (d) The power voltage of brushless motor 2 exceeds a set value;
 (e) A time needed to shift to a stable operation state after engine start has elapsed; and
 (f) No learning has been performed in the same temperature condition.

Condition (a) is intended to determine whether or not there is no request to drive electric oil pump 1. Even during engine stop, if there is no request to drive electric oil pump 1, this leaning condition can be determined to be met.

Condition (b) is intended to determine whether or not the oil temperature is within a temperature range of threshold learning, in below-mentioned threshold learning for each temperature condition. When the oil temperature detected by an oil temperature sensor 12 is not within the learning range, no learning is performed.

Condition (c) is intended to permit learning when brushless motor 2, motor drive circuit 212, controller 213, and the like are normal and so it is expected that threshold learning can be performed normally.

Condition (d) is intended to determine whether or not the power voltage is such a level that ensures learning accuracy, based on whether or not the power voltage exceeds the set value.

Condition (e) is intended to permit learning in a state in which the engine is operated stably.

Condition (f) is intended to permit learning when the current temperature is an unlearned temperature condition and prohibit learning when the current temperature is an already learned temperature condition, upon learning the threshold used to determine switching of each energization mode for each temperature of brushless motor 2.

For example, as illustrated in FIG. 34, the threshold used to determine switching of each energization mode is learned for each temperature of 15° C., 50° C., 80° C., and 110° C. As threshold V2-3 used to determine switching from energization mode (2) to energization mode (3), threshold V2-3 stored corresponding to 80° C. is used when the temperature is 80° C.

Here, if the motor temperature upon determining whether or not the threshold learning condition is met in step 102 is an unlearned temperature, learning is permitted. If the motor temperature is an already learned temperature or a time elapsed from recent learning is sufficiently short, learning is not performed.

In threshold learning for each temperature, for example when, as threshold V2-3 used to determine switching from energization mode (2) to energization mode (3), threshold V2-3 corresponding to the motor temperature of 80° C. has already been learned but threshold V2-3 corresponding to the other temperature conditions has not been learned, threshold V2-3 learned at 80° C. may be applied to all temperature conditions to determine switching from energization mode (2) to energization mode (3).

Meanwhile, for example, when threshold V2-3 used to determine switching from energization mode (2) to energization mode (3) has already been teamed in a plurality of temperature conditions, threshold V2-3 corresponding to an unlearned temperature condition may be estimated from interpolation or the like based on threshold V2-3 corresponding to the learned temperature conditions.

The temperature as the threshold learning condition may be the temperature of brushless motor 2 or a temperature correlated with the motor temperature. Examples of the temperature correlated with the motor temperature include a temperature of oil pumped by electric oil pump 1, an engine coolant temperature, and the like. The motor temperature may also be estimated from an outside air temperature, power consumption in brushless motor 2, and the like.

Note that the threshold learning condition is not limited to conditions (a) to (f) mentioned above. Part of conditions (a) to (f) may be employed as the threshold learning condition, or a logical OR or a logical AND of a plurality of conditions or a combination of the logical OR and the logical AND may be used to determine whether or not the threshold learning condition is met. Moreover, idle reduction may be prohibited in the case in which the threshold has not been learned yet.

When the threshold learning condition is determined to be met in step 102, the process goes to step 103, where the above-mentioned threshold learning is performed.

In the above-mentioned threshold learning, six thresholds V1-2, V2-3, V3-4, V4-5, V5-6, and V6-1 corresponding to the six energization mode switching patterns are learned. Therefore, even when there are variations between three phases, the energization mode can be switched at an appropriate timing.

However, in the case in which variations between three phases are expected to be sufficiently small, thresholds V1-2, V2-3, V3-4, V4-5, V5-6, and V6-1 having a common absolute value may be set based on the individually learned six thresholds, to determine energization mode switching.

In detail, each threshold used to determine threshold mode switching is set based on a minimum value of the absolute values of individually learned six thresholds V1-2, V2-3, V3-4, V4-5, V5-6, and V6-1, as illustrated in FIG. 35.

In each energization mode switching of energization mode (1)→energization mode (2), energization mode (3)→energization mode (4), and energization mode (5)→energization mode (6), the voltage of the non-energized phase decreases to the negative side with respect to the reference voltage. Meanwhile, in each energization mode switching of energization mode (2)→energization mode (3), energization mode (4)→energization mode (5), and energization mode (6)→energization mode (1), the voltage of the non-energized phase increases to the positive side with respect to the reference voltage. In view of this, (minimum absolute value)×−1 is set as the threshold in energization mode switching where the voltage of the non-energized phase decreases to the negative side, and the minimum absolute value is directly set as the threshold in energization mode switching where the voltage of the non-energized phase increases to the positive side.

Though a simple average of the absolute values of the six thresholds may be used as the absolute value common to each threshold used to determine energization mode switching, there is a possibility that, if the terminal voltage of the non-energized phase does not cross the threshold, the energization mode is unable to be switched, and step-out of brushless motor 2 occurs. Therefore, it is preferable to select the minimum value so that, in an energization mode having a threshold of a relatively low absolute value, the terminal voltage of the non-energized phase crosses the threshold to enable the energization mode to be switched.

Alternatively, for example, threshold learning may be performed only for part of the six energization mode switching patterns, with an absolute value of a learned threshold being used as an absolute value of a threshold used to determine other energization mode switching.

It is also possible to set a common threshold in each energization mode switching of energization mode (1)→energization mode (2), energization mode (3)→energization mode (4), and energization mode (5)→energization mode (6) where the voltage of the non-energized phase decreases to the negative side with respect to the reference voltage, and set a common threshold in each energization mode switching of energization mode (2)→energization mode (3), energization mode (4)→energization mode (5), and energization mode (6)→energization mode (1) where the voltage of the non-energized phase increases to the positive side with respect to the reference voltage.

In detail, as illustrated in FIG. 36, in each energization mode switching of energization mode (1)→energization mode (2), energization mode (3)→energization mode (4), and energization mode (5)→energization mode (6), a maximum value of thresholds V1-2, V3-4, and V5-6, i.e., a value closest to the reference voltage from among thresholds V1-2, V3-4, and V5-6 which are calculated as negative values, is selected, and selected threshold V is learned as a common threshold of each energization mode switching of energization mode (1)→energization mode (2), energization mode (3)→energization mode (4), and energization mode (5)→energization mode (6).

Meanwhile, in each energization mode switching of energization mode (2)→energization mode (3), energization mode (4)→energization mode (5), and energization mode (6)→energization mode (1), a minimum value of thresholds V2-3, V4-5, and V6-1, i.e., a value closest to the reference voltage from among thresholds V2-3, V4-5, and V6-1 which are calculated as positive values, is selected, and selected threshold V is learned as a common threshold of each energization mode switching of energization mode (2)→energization mode (3), energization mode (4)→energization mode (5), and energization mode (6)→energization mode (1).

Moreover, upon determining the energization mode switching timing based on the learned threshold, it is preferable to correct the threshold according to the motor rotation speed at the time.

The induced voltage in the non-energized phase is lower when the motor rotation speed is lower. Accordingly, the threshold is decreased in absolute value when the motor rotation speed is lower and the induced voltage is lower, whereas the threshold is increased in absolute value when the motor rotation speed is higher and the induced voltage is higher. This enables the threshold to be changed according to the magnitude of the induced voltage that depends on the motor rotation speed. As a result, the energization mode can be switched at an appropriate timing even when the motor rotation speed changes.

Figure 37:
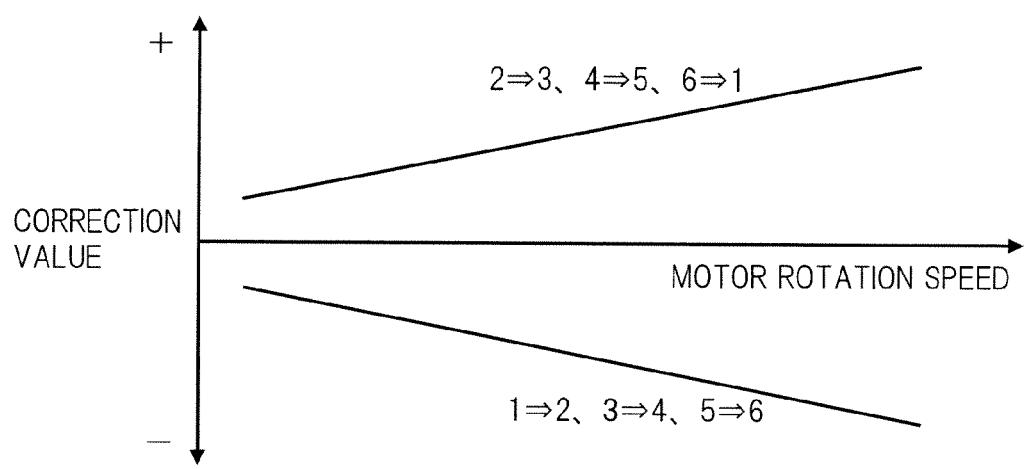
FIG. 37 is a diagram illustrating characteristics of a voltage threshold correction value according to a motor rotation speed in the embodiment of the present invention.

In detail, the threshold is corrected using a correction value corresponding to the motor rotation speed, according to the following equation (15). As the correction value, a negative correction value whose absolute value increases with an increase in motor rotation speed is set for each energization mode switching of energization mode (1)→energization mode (2), energization mode (3)→energization mode (4), and energization mode (5)→energization mode (6), and a positive correction value whose absolute value increases with an increase in motor rotation speed is set for each energization mode switching of energization mode (2)→energization mode (3), energization mode (4)→energization mode (5), and energization mode (6)→energization mode (1), as illustrated in FIG. 37.

$$\text{(threshold)} = \text{(threshold)} + \text{(correction value)} \quad \text{Equation (15)}$$

$$\text{(correction value)} = \text{(motor rotation speed)} \times \text{(induced voltage constant)} \times 1/2$$

This threshold correction according to the motor rotation speed is applicable not only in the case in which energization mode switching is determined using each individual learning result, but also in the case in which thresholds having a common absolute value are used.

Note that the correction value corresponding to the motor rotation speed may be calculated using a calculating equation, or specified using a conversion table for converting the motor rotation speed to the correction value.

In threshold learning, when switching from the energization state for setting the initial position to the energization state corresponding to the energization mode or when switching from the energization state corresponding to the energization mode for positioning at the angular position of energization mode switching to the energization state corresponding to the next energization mode, if the PWM signal has a high duty cycle, the motor rotation speed increases, causing a speed electromotive force to be exerted on the terminal voltage of the non-energized phase. This leads to a decrease in threshold learning accuracy.

In view of this, in threshold learning, it is desirable that the induced voltage in the non-energized phase can be detected while limiting the motor rotation speed by generating the PWM signal of a low duty cycle. This can be done by performing pulse shift described later.

Figure 38:
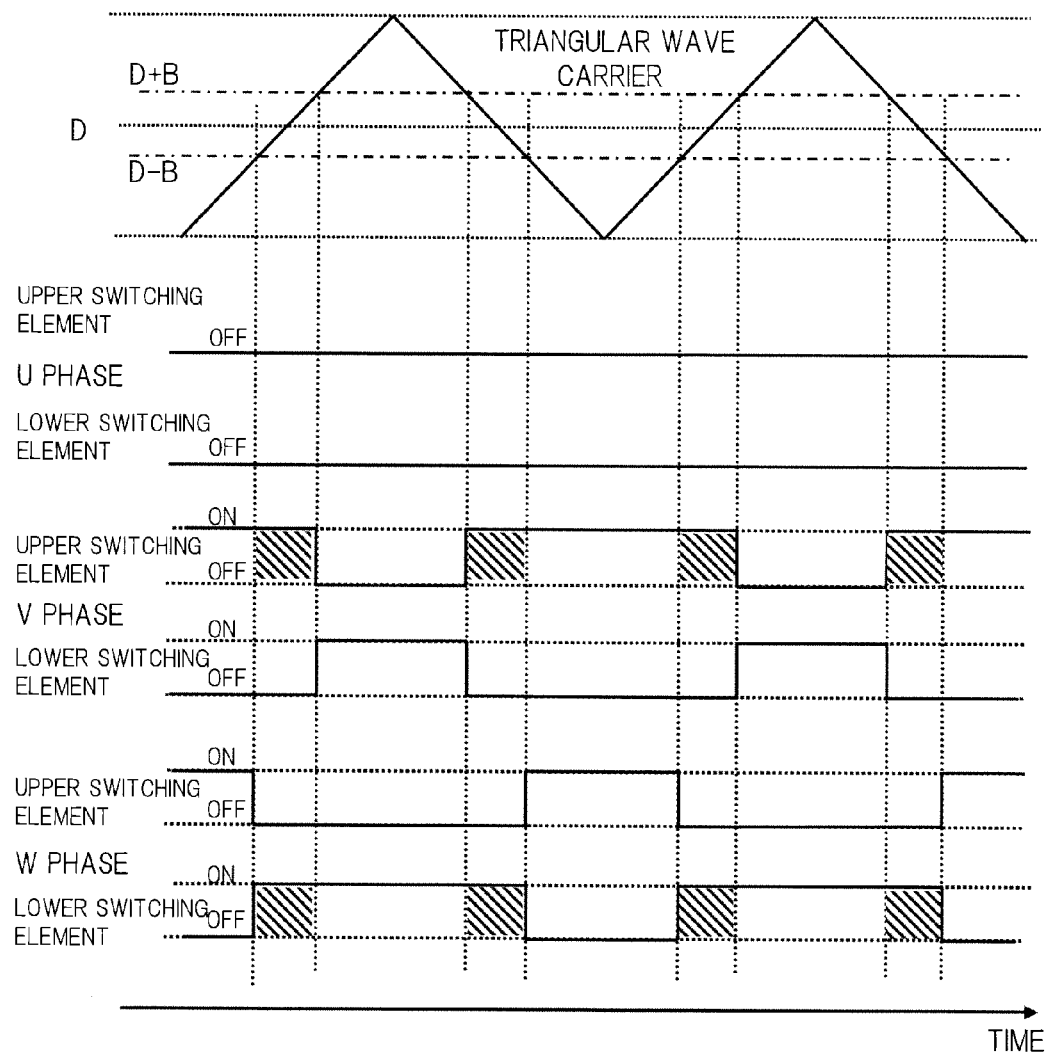
FIG. 38 is a time chart illustrating a state of PWM generation in the embodiment of the present invention.

FIG. 38 is a diagram illustrating a typical PWM signal generation process.

In FIG. 38, D denotes an intermediate value of a triangular wave carrier, and B denotes a voltage command value. A result of comparing the triangular wave carrier and a voltage command value (D+B) is used in PWM of the V phase, while a result of comparing the triangular wave carrier and a voltage command value (D−B) is used in PWM of the W phase.

That is, the upper switching element of the V phase is ON in a period during which voltage command value (D+B) is higher than the triangular wave carrier, and the lower switching element of the W phase is ON in a period during which the triangular wave carrier is higher than voltage command value (D−B).

However, in the PWM generation illustrated in FIG. 38, when the duty cycle is low, a time during which both the V phase and the W phase are energized is short, resulting in a failure to detect the induced voltage in the non-energized phase. If, however, the duty cycle is increased to extend the time during which both the V phase and the W phase are energized and thereby enable the induced voltage to be detected, the motor rotation speed increases, causing a speed electromotive force to be exerted on the terminal voltage of the non-energized phase.

Figure 39:
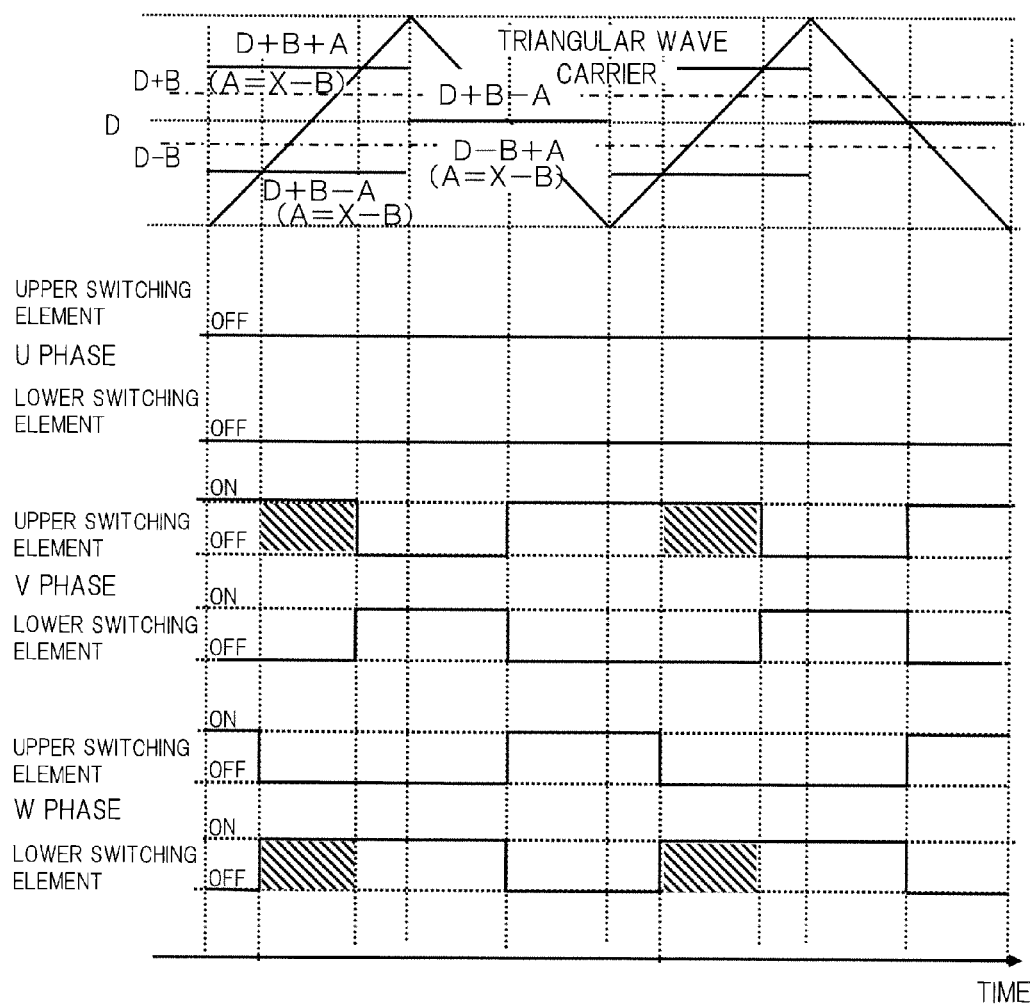
FIG. 39 is a time chart illustrating a state of PWM generation with pulse shift in the embodiment of the present invention.

To solve this problem, the pulse shift illustrated in FIG. 39 is performed to extend the time during which the two phases are both energized, with the same duty cycle as the PWM generation illustrated in FIG. 38. This enables the induced voltage in the non-energized phase to be detected, while suppressing the speed electromotive force.

In the pulse shift illustrated in FIG. 39, the voltage command value is corrected depending on whether the triangular wave carrier is rising or falling.

In detail, in a rising period of the triangular wave carrier, voltage command value (D+B) is increased by a correction value A (A=X−B) whereas voltage command value (D−B) is decreased by correction value A (A=X−B) so that the voltage command value has a difference of X from intermediate value D of the triangular wave carrier. In a falling period of the triangular wave carrier, on the other hand, voltage command value (D+B) is decreased by correction value A (A=X−B) whereas voltage command value (D−B) is increased by correction value A (A=X−B) so that the voltage command value is closer to intermediate value D of the triangular wave carrier.

As a result of the above-mentioned correction of the voltage command value, the time during which both the V phase and the W phase are energized in the falling period of the triangular wave carrier becomes shorter, which contributes to a longer time during which both the V phase and the W phase are energized in the rising period of the triangular wave carrier. Thus, the time during which the two phases are both energized can be extended without changing the duty cycle.

In step 103 in the flowchart of FIG. 33, in the case in which the threshold learning condition is continuously met for a time sufficient for learning while threshold learning is performed in the above manner, the learning is completed. In the case in which the threshold learning condition is not maintained for the time sufficient for learning, such as when a request for idle reduction occurs during learning, the learning is stopped at this point.

In step 104, whether or not the learning ends normally is determined.

Here, a normal end of learning corresponds to the case in which the routine for threshold learning is run at least once and also the obtained threshold is within the normal range. Meanwhile, an abnormal end of learning corresponds to the case in which the learning is stopped halfway due to an idle reduction request or the like, or the case in which no threshold within the normal range is obtained even though the learning is performed a predetermined number of times or for a predetermined period.

When the learning ends normally, the process goes to step 105, where the previously stored value of the threshold is updated based on the threshold newly obtained in step 103.

When the learning ends abnormally, the process goes to step 106, where the previous value or the initial value is retained without updating the threshold.

In step 107, whether or not an idle reduction condition is met, i.e., whether or not a request to drive electric oil pump 1 by brushless motor 2 occurs, is determined.

In the case in which the idle reduction condition is not met, there is a possibility that the threshold learning has not been completed yet, such as when the threshold learning corresponding to a different temperature condition has not been performed yet. In this case, the process returns to step 102 to determine whether or not the threshold learning condition is met.

Here, if there is no unlearned threshold and the threshold teaming has been completed, motor control drive 3 may wait for the idle reduction condition to be met.

In the case in which the idle reduction condition is met, the process goes to step 108 to perform sensorless control. In the sensorless control, brushless motor 2 is driven by comparing the learned threshold and the voltage of the non-energized phase and switching the energization mode accordingly.

In step 109, in a state in which brushless motor 2 is being driven while switching the energization mode based on the teamed threshold, whether or not step-out occurs is detected.

Various known methods may be employed for detecting step-out. For instance, step-out can be detected based on comparison between a current period and a voltage period of brushless motor 2, as disclosed in Japanese Laid-Open (Kokai) Patent Application Publication No. 2001-25282.

When step-out of brushless motor 2 occurs, it is determined that the energization mode switching timing deviates from a desired angular position because the threshold is inappropriate, and the process returns to the learning condition determination of step 102.

When step-out occurs, it is preferable to forcefully terminate idle reduction and restart the engine, before starting threshold learning. Upon forcefully terminating idle reduction, an abnormality warning may be made to the vehicle driver by a lamp or the like.

In the case in which the threshold is re-learned after step-out, the re-learned threshold may directly be used to determine the energization mode switching timing. However, in order to prevent a situation in which step-out occurs again as a result of using the re-learned threshold, it is preferable to correct the re-learning result based on relative comparison between the threshold used at the time of step-out and the re-learned threshold, and use the corrected re-learning result for determining the energization mode switching timing.

When the absolute value of the threshold is larger than an appropriate value, step-out is likely to occur. When the absolute value is excessively small, on the other hand, efficiency decreases. Accordingly, the re-learning result may be corrected in the following manner, as an example.

In the case in which the absolute value of the re-learned threshold is smaller than the absolute value of the threshold at the time of step-out, the re-learned threshold is directly used to determine the energization mode switching timing.

In the case in which the absolute value of the re-learned threshold is equal to the absolute value of the threshold at the time of step-out, the absolute value of the re-learned threshold is corrected to be smaller by a set voltage, and the corrected threshold is used to determine the energization mode switching timing. Here, if the set voltage is excessively small, there is a possibility that step-out occurs again even when the corrected voltage threshold is used. Conversely, if the set voltage is excessively large, efficiency decreases. Therefore, the set voltage is adjusted beforehand so as to suppress reoccurrence of step-out with a voltage as small as possible, based on angle-voltage correlation.

In the case in which the absolute value of the re-learned threshold is larger than the absolute value of the threshold at the time of step-out, there is a high possibility of step-out if the threshold is directly used. Accordingly, a result of correcting the absolute value of the threshold at the time of step-out to be smaller by the set voltage is used to determine the energization mode switching timing.

In detail, for example, when the threshold at the time of step-out is 0.5 V and the re-learned threshold is 0.3 V which is lower than the threshold at the time of step-out, 0.3 V is directly used to determine the energization mode switching timing. When the threshold at the time of step-out is 0.5 V and the re-learned threshold is 0.5 V which is equal to the threshold at the time of step-out, a voltage of 0.4 V obtained by subtraction of the set voltage such as 0.1 V is used as the threshold. When the threshold at the time of step-out is 0.5 V and the re-learned threshold is 1.0 V which is higher than the threshold at the time of step-out, a voltage of 0.4 V obtained by subtraction of the set voltage such as 0.1 V from 0.5 V, i.e., the threshold at the time of step-out, is used as the threshold.

The threshold corrected after step-out as mentioned above may be stored so that, upon restart after ending the vehicle operation by turning off the ignition switch or the like, the voltage threshold is changed based on, for example, a weighted average of this stored value and an initially set threshold or an initial learned threshold.

When no step-out occurs, it can be determined that the appropriate value is learned as the threshold. Accordingly, brushless motor 2 is continuously driven without re-learning.

In step 110, when the driver ends the vehicle operation and turns off the ignition switch, the learned threshold is stored in a backup RAM or the like, thereby ending threshold learning and control of brushless motor 2.

Though brushless motor 2 is a three-phase motor in the above embodiment, the number of phases is not limited to three. Besides, 180-degree energization may be used instead of 120-degree energization.

Moreover, the brushless motor for which the threshold used to determine energization mode switching is learned and the energization mode is switched sensorlessly based on the learning result is not limited to a motor used for driving an electric oil pump.

The entire contents of Japanese Patent Application No. 2010-065737, filed Mar. 23, 2010 and Japanese Patent Application No. 2010-143621, filed Jun. 24, 2010 are incorporated herein by reference.

While only select embodiments have been chosen to illustrate the present invention, it will be apparent to those skilled in the art from this disclosure that various change and modification can be made herein without departing from the scope of the invention as defined in the appended claims.

Furthermore, the foregoing description of the embodiments according to the present invention is provided for illustration only, and not for the purpose of limiting the invention, the invention as claimed in the appended claims and their equivalents.

What is claimed is:

1. A brushless motor drive apparatus that rotatively drives a brushless motor having a plurality of windings by switching an energization mode for phases of the brushless motor, the brushless motor drive apparatus comprising:
   a unit configured to switch the energization mode based on a result of comparison between a voltage of a non-energized phase and a threshold; and
   a unit configured to switch to a next energization mode from a state in which the brushless motor is stopped at an angular position for switching the energization mode by maintaining one energization mode, detecting the voltage of the non-energized phase at the angular position for switching the energization mode, and setting the threshold based on the detected voltage of the non-energized phase.

2. The brushless motor drive apparatus according to claim 1, further comprising a unit configured to detect a temperature of the brushless motor,
   wherein the unit configured to switch to the next energization mode is configured to set the threshold for each temperature of the brushless motor.

3. The brushless motor drive apparatus according to claim 1, further comprising a unit configured to detect a step-out of the brushless motor,
   wherein the unit configured to switch to the next energization mode is configured to set the threshold in a case in which the step-out of the brushless motor is detected.

4. The brushless motor drive apparatus according to claim 1, wherein the unit configured to switch to the next energization mode is configured to correct the threshold according to a motor rotation speed.

5. The brushless motor drive apparatus according to claim 1, wherein the unit configured to switch to the next energization mode is configured to set a threshold common to a plurality of energization modes, based on a threshold set for each energization mode.

6. The brushless motor drive apparatus according to claim 5, wherein the unit configured to switch to the next energization mode is configured to set the threshold common to the plurality of energization modes, based on a threshold having a minimum absolute value among a plurality of thresholds obtained by setting the threshold for each energization mode.

7. The brushless motor drive apparatus according to claim 1, wherein the brushless motor is an electric oil pump that pumps oil to a vehicle automatic transmission, the electric oil pump being provided in parallel with a mechanical oil pump that is driven by an engine to pump oil to the vehicle automatic transmission, and
wherein the unit configured to switch to the next energization mode is configured to perform phase energization for setting the threshold when the engine is in operation and the mechanical oil pump is pumping oil to the vehicle automatic transmission.

8. The brushless motor drive apparatus according to claim 1, wherein the unit configured to switch to the next energization mode is configured to:
start phase energization from the state in which the brushless motor is stopped at the angular position by maintaining the one energization mode, and switching to the next energization mode, and
set the threshold based on the voltage of the non-energized phase immediately after the switching to the next energization mode.

9. The brushless motor drive apparatus according to claim 8, wherein the unit configured to switch to the next energization mode is configured to set, based on the voltage of the non-energized phase immediately after the switching to the next energization mode, the threshold used to determine switching to the next energization mode.

10. A brushless motor drive apparatus that rotatively drives a brushless motor having a plurality of windings by switching an energization mode for phases of the brushless motor, the brushless motor drive apparatus comprising:
a unit configured to switch the energization mode based on a ison between a voltage of a non-energized phase and a threshold; and
a unit configured to start chase energization based on the energization mode from state in which the brushless motor is stored at an initial position,
wherein the unit configured to start the phase energization is further configured to set the threshold based on at least one of a maximum value and a minimum value of the voltage of the non-energized phase within a measurement time from when the phase energization is started.

11. The brushless motor drive apparatus according to claim 10, wherein the unit configured to start the phase energization is configured to set the threshold based on:
the voltage of the non-energized phase when the phase energization is started; and
at least one of the maximum value and the minimum value of the voltage of the non-energized phase within the measurement time from when the phase energization is started.

12. The brushless motor drive apparatus according to claim 10, wherein the unit configured to start the phase energization is configured to drive the brushless motor to the initial position by energizing all phases of the brushless motor.

13. The brushless motor drive apparatus according to claim 10, wherein the unit configured to start the phase energization is configured to drive the brushless motor to the initial position by performing energization corresponding to one energization mode.

14. The brushless motor drive apparatus according to claim 10, wherein the unit configured to start the phase energization is configured to start the phase energization in the energization mode for which the threshold is to be set, after a delay time elapses from when setting an energization state for driving the brushless motor to the initial position.

15. A brushless motor drive apparatus that rotatively drives a brushless motor having a plurality of windings by switching an energization mode for phases of the brushless motor, the brushless motor drive apparatus comprising:
a means for switching the energization mode based on a result of comparison between a voltage of a non-energized phase and a threshold; and
a means for switching to a next energization mode from a state in which the brushless motor is stopped at an angular position for switching the energization mode by maintaining one energization mode, detecting the voltage of the non-energized phase at the angular position for switching the energization mode, and setting the threshold based on the detected voltage of the non-energized phase.

16. A brushless motor drive method for driving a brushless motor having a plurality of windings, the brushless motor drive method comprising:
stopping the brushless motor at an angular position for switching an energization mode by maintaining one energization mode;
switching to a next energization mode from a state in which the brushless motor is stopped;
detecting a voltage of a non-energized phase at the angular position for switching the energization mode;
setting a threshold, based on the detected voltage of the non-energized phase; and
switching the energization mode based on a result of comparison between the voltage of the non-energized phase and the threshold.

17. A brushless motor drive method for driving a brushless motor having a plurality of windings, the brushless motor drive method comprising:
stopping the brushless motor at an initial position;
starting phase energization based on an energization mode from a state in which the brushless motor is stopped; and
setting a threshold, based on at least one of a maximum value and a minimum value of a voltage of a non-energized phase within a measurement time from when the phase energization is started.

18. A brushless motor drive apparatus that rotatively drives a brushless motor having a plurality of windings by switching an energization mode for phases of the brushless motor, the brushless motor drive apparatus comprising:
a means for switching the energization mode based on a result of comparison between a voltage of a non-energized phase and a threshold; and
a means for starting phase energization based on the energization mode from a state in which the brushless motor is stopped at an initial position, and for setting the threshold based on at least one of a maximum value and a minimum value of the voltage of the non-energized phase within a measurement time from when the phase energization is started.

* * * * *